(12) United States Patent
Breach

(10) Patent No.: US 9,232,829 B2
(45) Date of Patent: Jan. 12, 2016

(54) SKI TRAINING DEVICE

(75) Inventor: Martin Breach, Ormskirk (GB)

(73) Assignee: SkiA Designs Limited, Haydock (GB)

( * ) Notice: Subject to any disclaimer, the term of this patent is extended or adjusted under 35 U.S.C. 154(b) by 51 days.

(21) Appl. No.: 13/394,584

(22) PCT Filed: Jun. 16, 2010

(86) PCT No.: PCT/GB2010/001163
§ 371 (c)(1),
(2), (4) Date: Mar. 7, 2012

(87) PCT Pub. No.: WO2011/042680
PCT Pub. Date: Apr. 14, 2011

(65) Prior Publication Data
US 2012/0178068 A1 Jul. 12, 2012

(30) Foreign Application Priority Data
Oct. 6, 2009 (GB) .................................. 0917427.7

(51) Int. Cl.
| | | |
|---|---|---|
| A63B 69/18 | (2006.01) | |
| A43B 5/04 | (2006.01) | |
| G09B 19/00 | (2006.01) | |
| A43C 11/14 | (2006.01) | |
| A63B 21/00 | (2006.01) | |
| A63B 22/16 | (2006.01) | |
| A63B 26/00 | (2006.01) | |

(52) U.S. Cl.
CPC ............. *A43B 5/0417* (2013.01); *A43B 5/0421* (2013.01); *A43C 11/146* (2013.01); *A63B 21/0004* (2013.01); *A63B 21/143* (2013.01); *A63B 22/16* (2013.01); *A63B 26/003* (2013.01); *A63B 69/18* (2013.01); *G09B 19/0038* (2013.01)

(58) Field of Classification Search
USPC .......................................................... 434/253
See application file for complete search history.

(56) References Cited

U.S. PATENT DOCUMENTS

| | | | | |
|---|---|---|---|---|
| 3,207,510 | A | * | 9/1965 | Gibson ............................ 482/71 |
| 3,929,329 | A | * | 12/1975 | Rivera ............................. 482/71 |
| 4,045,890 | A | * | 9/1977 | D'Alessandro et al. ......... 36/132 |
| 4,251,068 | A | | 2/1981 | Tarnacki |
| 4,273,327 | A | | 6/1981 | Nall et al. |
| 4,291,473 | A | * | 9/1981 | Sartor ............................. 36/132 |
| RE32,273 | E | * | 11/1986 | Guild ............................ 36/117.3 |
| 4,694,684 | A | * | 9/1987 | Campbell, III ............... 73/65.07 |

(Continued)

FOREIGN PATENT DOCUMENTS

| | | |
|---|---|---|
| CH | 610499 A5 | 4/1979 |
| EP | 0338295 A3 | 8/1990 |

(Continued)

*Primary Examiner* — Xuan Thai
*Assistant Examiner* — James Hull
(74) *Attorney, Agent, or Firm* — Heslin Rothenberg Farley Mesiti, PC; Victor Cardona

(57) ABSTRACT

A combination of a ski boot and a training aid (110) attached thereto that is suitable for training a user to focus pressure on the sweet spot of a ski; wherein the training aid (110) comprises a balancing member (122) positioned underneath the ski boot at a location that would be vertically aligned with the sweet spot of a ski if the training aid were fitted to the ski boot; the training aid (110) allowing the user wearing a pair of ski boots, without skis and with a training aid attached to each boot, to pivot about the balancing members (122) until a desired balancing position is reached, whereby pressure is focussed at a spot corresponding to said sweet spot.

14 Claims, 27 Drawing Sheets

(56) References Cited

U.S. PATENT DOCUMENTS

| | | | | |
|---|---|---|---|---|
| 4,774,775 A | * | 10/1988 | Pruitt | 36/132 |
| 4,958,445 A | * | 9/1990 | Brisco | 36/7.5 |
| 4,966,364 A | * | 10/1990 | Eggenberger | 482/146 |
| 5,188,578 A | * | 2/1993 | Voigt | 482/71 |
| 5,496,239 A | | 3/1996 | Kallman et al. | |
| 5,685,807 A | * | 11/1997 | Tong et al. | 482/77 |
| 5,727,338 A | * | 3/1998 | George et al. | 36/93 |
| 5,871,298 A | * | 2/1999 | Lekhtman et al. | 402/77 |
| 5,897,474 A | * | 4/1999 | Romero | 482/146 |
| 5,916,071 A | * | 6/1999 | Lee | 482/77 |
| 6,421,935 B1 | * | 7/2002 | Bartlett | 36/132 |
| 6,436,012 B1 | * | 8/2002 | Naville | 482/77 |
| 6,666,797 B1 | * | 12/2003 | Martin | 482/51 |
| 6,767,313 B2 | * | 7/2004 | Sayce | 482/71 |
| 7,500,324 B1 | * | 3/2009 | Power et al. | 36/132 |
| 7,614,987 B2 | * | 11/2009 | Guadagno | 482/142 |
| 7,775,952 B1 | * | 8/2010 | Curran et al. | 482/146 |
| 8,177,653 B2 | * | 5/2012 | Antolick | 473/217 |
| 8,397,404 B2 | * | 3/2013 | Kim | 36/103 |
| 2004/0009859 A1 | * | 1/2004 | Gottlieb | 482/146 |
| 2006/0082089 A1 | * | 4/2006 | Rejtano | 280/87.042 |
| 2007/0108734 A1 | * | 5/2007 | Korich | 280/607 |
| 2009/0110867 A1 | * | 4/2009 | Feng Shen | 428/71 |
| 2012/0036738 A1 | * | 2/2012 | Willis | 36/73 |

FOREIGN PATENT DOCUMENTS

| | | |
|---|---|---|
| FR | 2703222 A1 | 10/1994 |
| JP | 2001157726 A | 6/2001 |
| WO | 9666660 A1 | 3/1996 |

\* cited by examiner

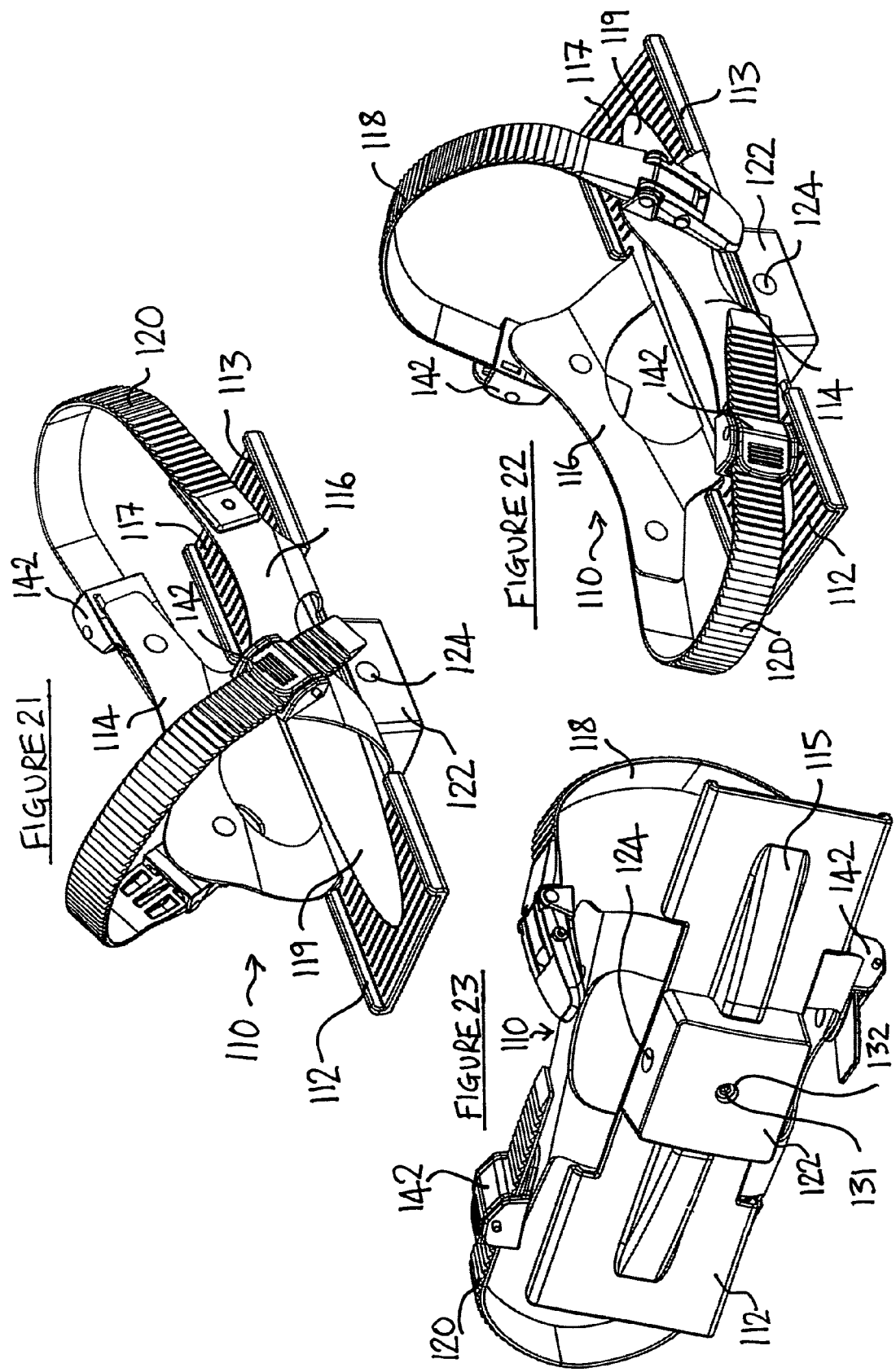

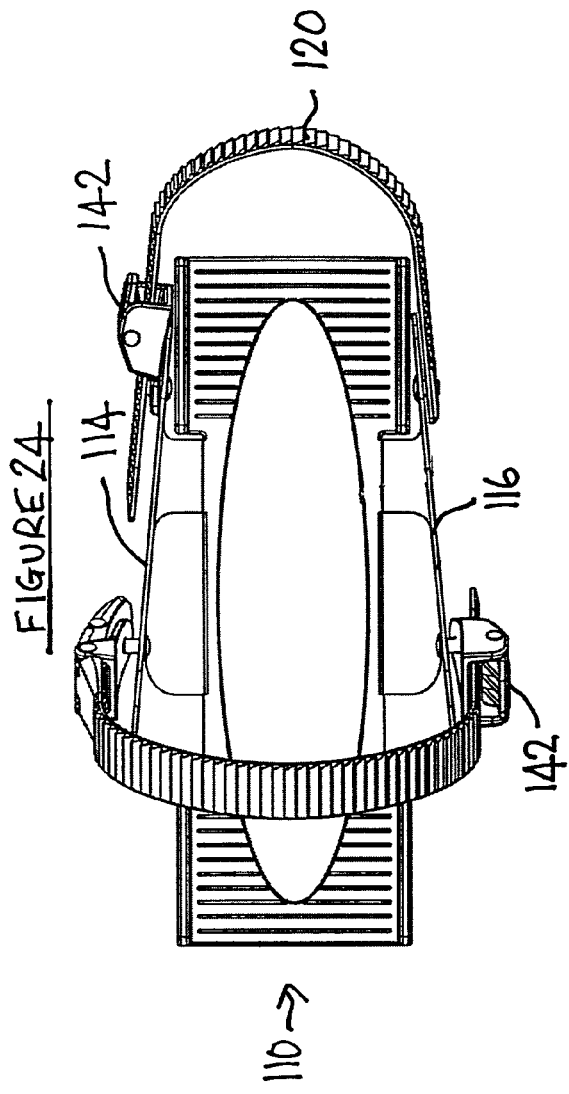
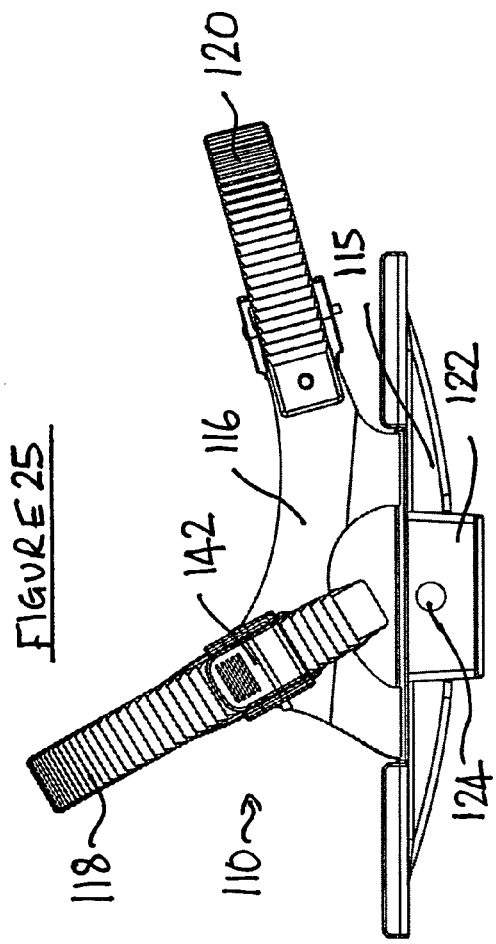
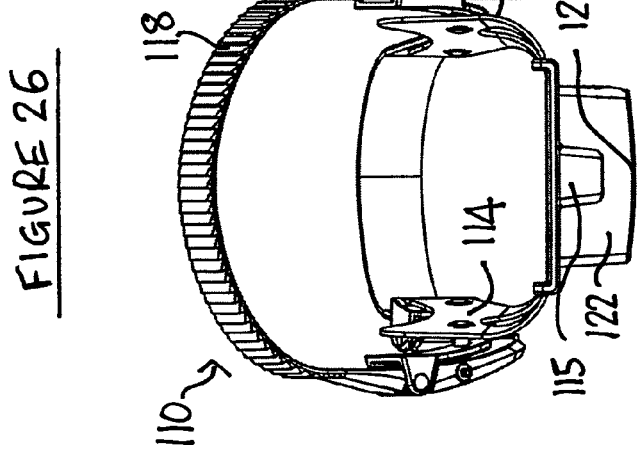
FIGURE 24
FIGURE 25
FIGURE 26

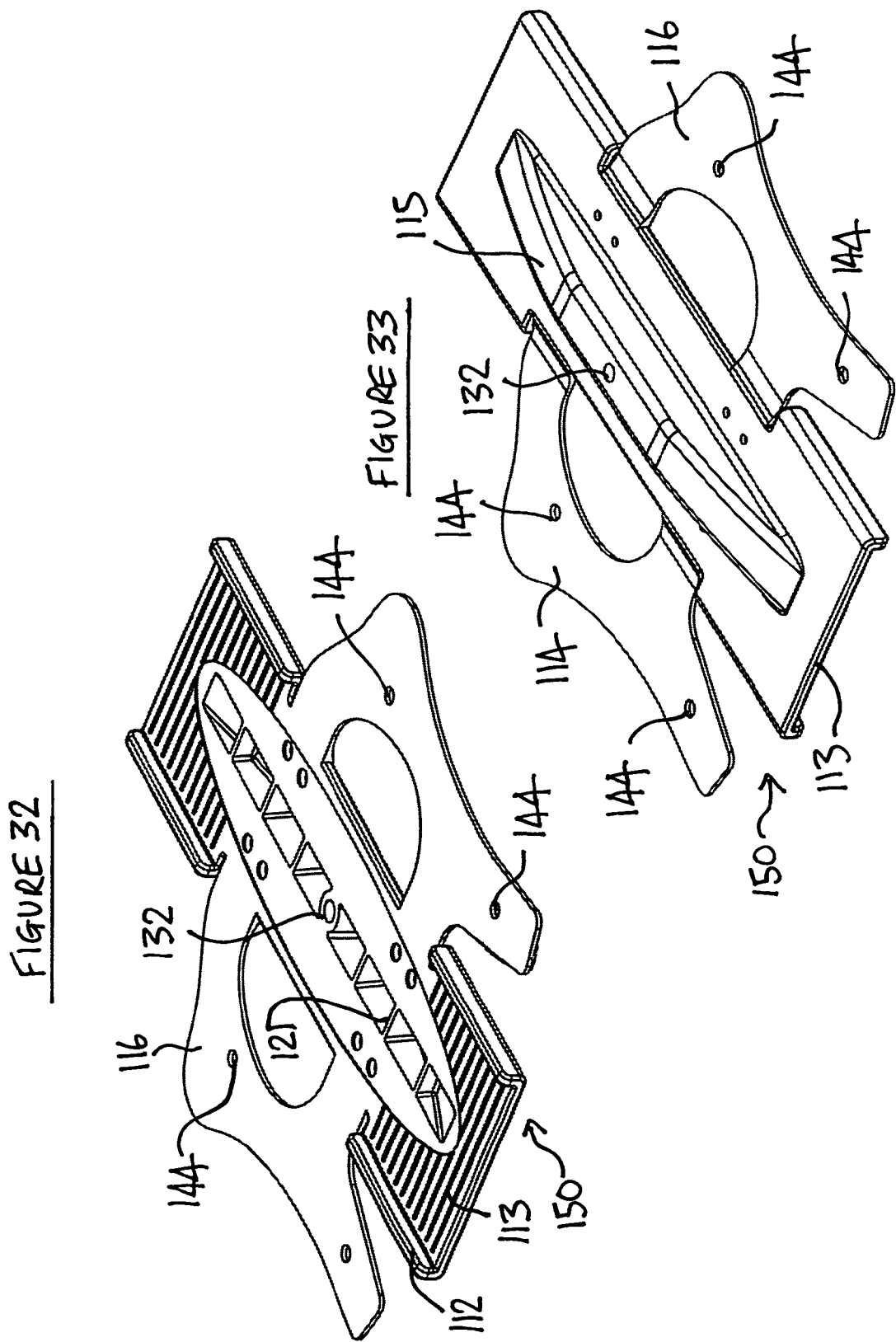

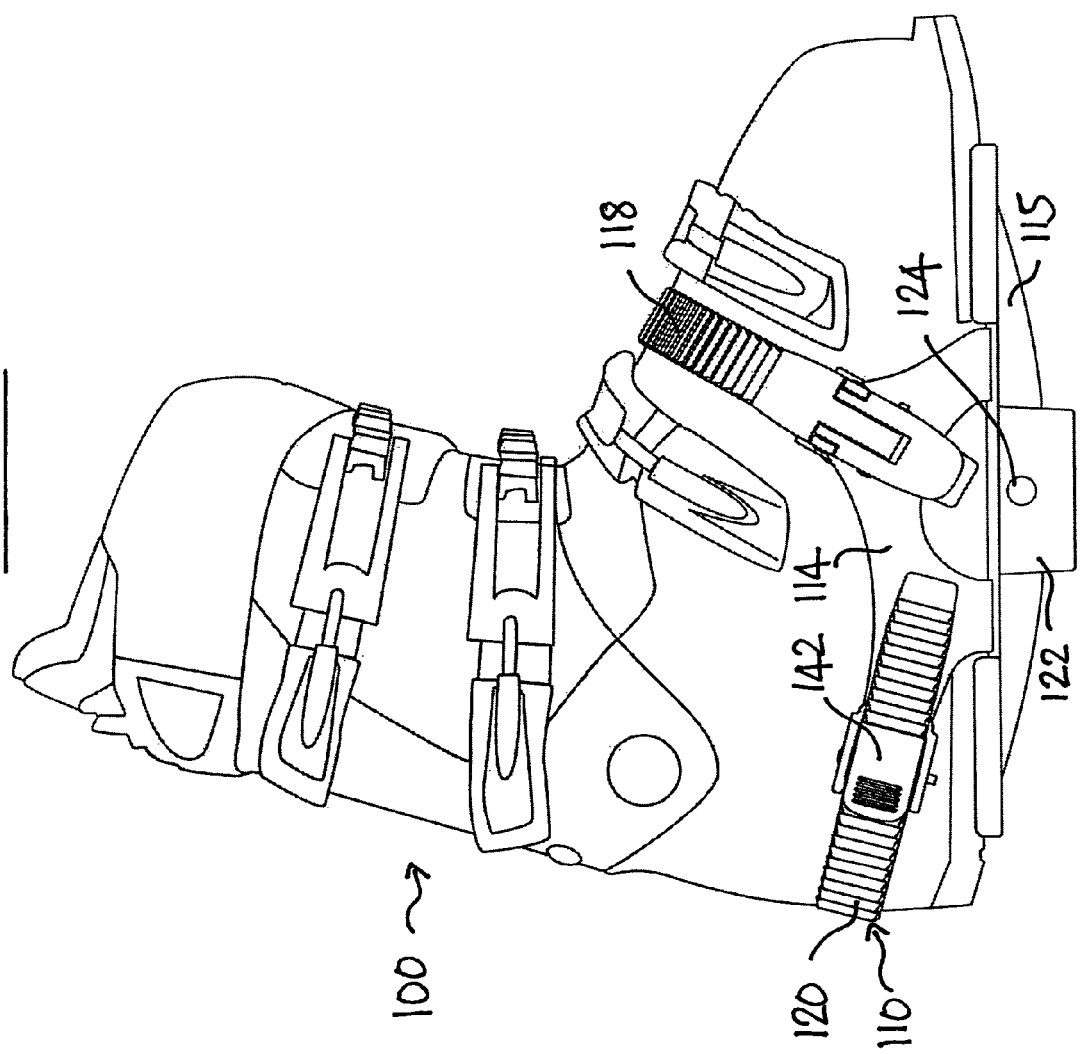

SKI TRAINING DEVICE

CROSS-REFERENCE TO RELATED APPLICATIONS

This application is an U.S. national phase application under 35 U.S.C. §371 based upon co-pending International Application No. PCT/GB2010/001163 filed on Jun. 16, 2010. Additionally, this U.S. national phase application claims the benefit of priority of co-pending International Application No. PCT/GB2010/001163 filed on Jun. 16, 2010 and Great Britain Application No. 0917427.7 filed on Oct. 6, 2009. The entire disclosures of the prior applications are incorporated herein by reference. The international application was published on Apr. 14, 2011 under Publication No. WO 2011/042, 680.

BACKGROUND OF THE INVENTION

1. Field of the Invention

The present invention relates to ski training, especially to training aids useful in practicing balancing for skiing, without needing to be on a ski slope.

2. Description of the Prior Art

Skiing is an exhilarating sport that is practised in many countries with good snow conditions. However it can be expensive to ski. Ski lessons can also be expensive.

A further issue is that climatic conditions are often not suitable for skiing even in established ski resorts. Typically there are only a few months during the winter when most resorts are open for skiing. Even then, there can be frequent interruptions due to adverse weather conditions. For example, there may be insufficient snowfall, excessive snowfall, excessive wind conditions, danger of avalanches etc.

It is also important to appreciate that many skiers have to travel abroad for ski holidays and therefore often have little time actually available on the ski slopes. Thus anything that can aid in improving technique prior to skiing can be helpful in ensuring that a skier makes maximum use of the limited time available on the ski slopes to enjoy skiing and to make further progress.

It is of course well known to practice on indoor dry ski venues. There are also indoor venues that provide artificial snow. However both dry ski and artificial snow venues can become very crowded and are often themselves expensive. Furthermore, they tend to attract a high proportion of beginners/very inexperienced skiers, who may get in the way of more experienced skiers trying to practice their technique. In any event there are not usually many such venues in most countries.

A large number of training aids have been developed that can be used at home, in hotels or in gyms in order to try to improve ski techniques. These are generally in the form of apparatuses having stationary bases and one or more movable components movably mounted to the base designed to mimic skiing or various aspects thereof.

Some training aids are also provided that are intended primarily to condition/strengthen muscles used in skiing.

Various known apparatuses will now be discussed, by way of example, so as to indicate current approaches.

WO 96/06660 disclosed an apparatus designed for training a user how to execute parallel turns. The apparatus is bulky. It includes a platform shaped as a small pair of skis onto which feet of a user are placed and which can move through an arc relative to a fixed horizontal base, whilst remaining parallel thereto. Side supports are also provided that are fixed to the base and are designed to mimic ski poles. End stops and returns (e.g. traction return springs) are also provided. These respectively function so as to prevent turning beyond a pe-set maximum and to return the user to a position in which training can continue.

U.S. Pat. No. 5,496,239 discloses another bulky ski training apparatus. Here two simulated skis are pivotally mounted at their front ends to an assembly that extends rearwardly over a back track. The simulator includes an adjustable declined platform on which the skis move in a manner so that they can be adjusted between wedge and parallel positions. Outwardly angled standing bars are also provided and are said to provide pulling forces that mimic the forces involved in ski turns.

U.S. Pat. No. 4,251,068 discloses an exercise apparatus for conditioning muscles used in skiing. A platform is provided for each foot. The platform includes boot engaging clamps that can be used to engage a ski. A strap may also be provided. Underneath the platform there is curved body portion that resembles the hull of a boat with a rounded bottom. This is attached to the platform by bolts or rivets and lies underneath the ski boot.

EP 0338295 disclosed another ski training apparatus. The apparatus is described as including a rotary platform and a stout belt attached via an elastic cable to the platform. A planar base is shown that attaches to the ground and provides stability. Half wheels are provided to allow the rocking movement. An advantage of the apparatus is said to be that it does not require the wearing of ski boots or the use of other specialised skiing equipment.

JP 2001-157726 discloses another complex ski training apparatus. This includes a base and an inclined plate that is hingedly mounted to the base. A pair of mock skis is provided above the inclined plate, with the mock skis mounted upon free bearings. A spring is provided on the front end of the inclined plate that aids in allowing a rocking motion to be provided. Inclination adjusting means are also provided as are stoppers that limit rotation. The apparatus is illustrated with a ski boot attached to a mock ski that is mounted upon said inclined plate.

US 2003/0060338 discloses a ski training apparatus useful for practicing parallel skiing. Two tillable foot platforms are provided which are mounted to rotation members, which are in turn rotatably mounted to a base platform. A key advantage is said to be that special footwear is not required, thus allowing a user to wear street shoes or tennis shoes, for example. With the front of the base raised a user's ankles are said to assume a leaning forward attitude that is used in parallel skiing. Rocking the base from side to side is said to simulate a change in attitude that occurs as a skier changes direction on a downhill slope.

It will be appreciated from the foregoing summary that, although a variety of ski training apparatuses are known, many are bulky and expensive to manufacture. The main common feature is that one or more bulky platforms are provided on which a user stands with or without ski boots mounted to said platforms. The main differences between the apparatuses are the ways in which the platforms are arranged relative to a supporting base.

Most of the existing ski training aids are far too large to be easily transported in a suitcase or other personal travel luggage. Thus, for example, people wishing to take ski holidays would not normally consider taking such aids with them, even though they might be useful in practicing techniques at a ski resort prior to skiing or following a session of skiing.

A further disadvantage of many existing ski training aids is their complexity. This can make it difficult for a beginner or even an intermediate skier to use them effectively to improve their technique.

Indeed, in many cases, the training aids are of doubtful practical use and may even result in a deterioration of skiing technique.

Furthermore, no existing ski training aids of which the present inventor is aware are specifically adapted for training a user to focus pressure on the sweet spot of a ski.

There is therefore a need to provide improved ski training aids, especially ones specifically adapted to training a user to focus pressure on said sweet spot. There is also a need to provide more portable ski training aids. There is a further need to provide ski training aids that are less expensive to manufacture than traditional skiing training devices.

SUMMARY OF THE INVENTION

The present invention aims to address or at least to alleviate one or more of said needs.

According to the present invention there is provided a combination of a ski boot and a training aid attached thereto suitable for training a user to focus pressure on the sweet spot of a ski; wherein the training aid comprises a balancing member positioned underneath the ski boot at a location that would be vertically aligned with the sweet spot of a ski if the training aid were fitted to the ski boot, the training aid allowing the user, when wearing a pair of ski boots without skis and with a training aid attached to each boot, to pivot about the balancing members until a desired balancing position is reached whereby pressure is focussed at a spot corresponding to said sweet spot.

In the desired balancing position the ski boots do not contact the ground. It is also preferred that, when in this position, the only part of the training aid attached to each boot that contacts the ground is the balancing member.

Training aids of the present invention can therefore be used to train a user in balancing in a manner that would be useful when skiing so as to apply significant pressure to the sweet spots of a pair of skis. Thus a user can be trained in shifting his/her weight to achieve this and can adopt postures/techniques used in achieving a balancing position later on, when skiing.

A training aid of the present invention is designed to be used without skis. This has various advantages, especially at an early stage of training.

One advantage is that the risk of injury, or even the fear of a risk of injury, can be substantially reduced, whilst still allowing a user to train in adopting a correct posture for focussing pressure on a notional sweet spot (i.e. a spot that would correspond to the sweet spot of a ski, if present).

This is because a training aid of the present invention can be used in a controlled environment so that even if a user of the device becomes unbalanced there is far less risk than would be the case on a ski slope.

In some cases, for example, cushioning may be provided, should the user fall or be at risk of falling.

Alternatively, or additionally, one or more supports may be provided. Thus, for example, the user may practice balancing whilst being supported initially by hand rails, ski poles, other supporting objects or by a person (e.g. an instructor, a friend or a relative).

Desirably, however, the user will seek to balance without using supports. Indeed supports, if present, may therefore simply be used when balance is lost. For example, a user may practice using a training aid of the present invention at home near a chair, rail sofa or wall. This can be can be used for temporary support, if needed and can prevent the risk of the user falling over. A temporary support may also be used whilst the user stands up and before an attempt to balance.

The provision of supports and/or cushioning is not however essential.

Indeed a user of the training aid will normally use it in a more controlled/safer environment than would be the case if that person were on a ski slope wearing skis. Many beginners have high levels of anxiety when on skis, which can be accentuated if the skis begin to slide in an undesired manner. By using a device of the present invention, at least for initial training, techniques can be developed without the risk of skis sliding in an uncontrolled manner on a ski slope and of accidents that my result from uncontrolled sliding of skis.

As indicated earlier, the balancing position corresponds to a position that would apply significant pressure to a sweet spot of a ski whilst skiing. Thus the invention allows a user to develop a "feel" for the sweet spot, whilst practicing in a safe and controlled environment (e.g. in a hotel room, a chalet room, at home or at a training centre).

Preferably the training aid allows a degree of pivoting/turning from side to side whilst still allowing a balancing position to be achieved (in which only the balancing member contacts the ground). This can, for example, enable the user to mimic ski turns whilst still being in the desired balancing position with only the balancing member contacting the ground.

The training aid may also, or alternatively, allow a degree of pivoting forwards and backwards e.g. to mimic skiing up or down a slope It is generally preferred that the training aid is releasably attached to a ski boot. This can be achieved in various ways.

In one embodiment of the present invention, this involves physical insertion of a part of the training aid into the ski boot. This may, for example, be achieved by providing a ski training aid with a protruding screw thread that is screwed into the base of a ski boot. (This is exemplified later on in Examples 1 to 12, with reference to FIGS. 1 to 20.)

Modern ski boots generally have fairly thick soles and thus can usually easily accommodate a screw thread without incurring damage affecting performance, unless the screw thread is excessively long. Thus the length of the exposed screw thread can be kept within safe limits that ensure that the sole of the ski boot is not damaged in a manner that substantially impairs performance or comfort. For example, it is clearly undesirable that the screw thread will protrude through the sole and into the interior space of the boot. The length of the screw thread can be selected to avoid any risk of this Other insertion means can be used. As alternatives to screws, bolts or even nails may even be used. These can all be considered releasable if they can be released from the boot with an appropriate tool (e.g. by using a screw driver, pliers, a wrench or spanner, a lever etc). In many cases the same tool may be used to attach and release the training aid from the boot. For example, a screw driver or key (e.g. an Allen key) may be used to screw and unscrew a training aid into/out of the ski boot by turning in opposite directions when engaged with the training aid.

There are of course many other possibilities for releasable attachment, including using releasable clamps, grips, ties, fasteners, tape, interconnecting male and female members, etc., all of which are within the scope of the invention. Temporary adhesive may even be used, although this is not preferred.

It is also possible to physically modify the ski boot prior to releasable attachment of the training aid, although this is not a preferred. For example it may be modified to provide to include a threaded insert in the sole of the ski boot that engages a screw thread.

Thus the ski boot may have a socket at a desired position for receiving a screw thread or for receiving other attachment means. (This is analogous to football boots having studs that are screwed into place in corresponding sockets). Alternatively, the ski boot may be physically modified in other ways to assist in releasable attachment of the training aid thereto. For example the ski boot itself may be manufactured so as to include clamps, catches, etc for engaging the training aid.

Preferably, however, standard ski boots are used, without any special modification being incorporated to engage a training aid of the present invention. Thus it is preferred that the training aid is releasably attached to a standard ski boot. This avoids the need for purchasing non-standard ski boots, which may of course result in additional expense or inconvenience.

As indicated above and also in Examples 1 to 12, releasable attachment of the training aid to a ski boot can be achieved simply by releasable insertion of a part of the aid into the sole of the ski boot.

It is however more preferred that a different ski boot engaging means is used, which does not physically insert into the ski boot, or otherwise affect the structure of the ski boot to a significant degree, beyond what might be expected via normal "wear and tear".

(Minor scratches, scuffs or indentations may be permitted, as may occur, for example, when strapping a training aid of the present invention to a ski boot, tightening, loosening or releasing the straps. This is because minor scratches, scuffs or indentations will normally be part of the normal wear and tear of a ski boot, in contrast to the more invasive action of screwing a screw thread into the sole of the ski boot.)

The ski boot engaging means may, for example, comprises a base that is shaped to contact the sole of the ski boot and releasable attachment means for the base that releasably attaches it to the ski boot, the balancing member being located below the base.

The releasable attachment means used for attaching the base to the ski boot may, for example, comprises one or more releasable ties, straps, clips, clamps, catches, grips, locks, etc.

Example 13 and associated FIGS. 21 to 38 illustrate the highly preferred aspect of the invention in which insertion into the sole of a ski boot (or indeed any other procedure modifying the general physical structure of the ski boot to any significant degree) is not required. Here releasable straps are used to strap the training aid to the ski boot, although other releasable attachment means could of course be used.

Example 13 and the associated figures also illustrate how the balancing member is releasably attached to a base of the training aid that is in contact with the ski boot.

The releasable attachment of the balancing member to the base of the training aid allows a range of different balancing members to be used in turn, as training program moves through various stages. This provides a range of difficulties in balancing.

More specifically as the ground-contacting surface area, of the balancing member is reduced (by replacing balancing members via the releasable attachment means), this allows a user to focus more and more specifically in balancing in a manner that would focus pressure on the sweet spots of a pair of skis, if the user were wearing skis.

A range of different balancing members providing can therefore be provided in a kit intended to allow a user to progress through different levels of balancing training and thereby to become increasingly more adept at focussing pressure on spots corresponding to sweet spots of skis. Thus a user can become increasingly more skilled and more competent at adopting appropriate postures and techniques for skiing.

Desirably, once the training aid has been removed, the ski boot can be used normally. Thus, if any adaptation allowing releasable attachment of the training aid to the boot is present in/on the boot (which is not preferred), it is desirable that this does not interfere with the normal use of the boot in skiing.

In any event, as indicated earlier, none of the various embodiments of the present invention require ski boots (or other footware), to be attached to bulky training platforms.

Desirably the training aid, when in use, will be less than twice the length of the ski boot. Preferably, it is less than 1.5 times, less than 1.25 times, or less than 1.1 times said length. More preferably, the training aid is not longer, or at least not substantially longer, than a ski boot to which it is releasably attached. Thus it is desired that it does not extend substantially beyond the toe or heel of the ski boot. Most preferably, it is shorter in length than the ski boot.

It may be wider than the ski boot (again when in use), especially if it includes components that wrap around the ski boot. Preferably however it is less than twice the width of the ski boot, less than 1.5 times, less than 1.25 times, or less than 1.1 times said width.

In some embodiments the training aid may have a width that is less than that of the ski boot, or even substantially less than said width. This may often be the case, for example, if the training aid is simply designed to insert into the sole of the ski boot and not to wrap around the ski boot. (See e.g. Examples 1 to 12, where the training aid occupies only a small part of the underside of a ski boot, so as to provide a pivot at a desired location corresponding to the notional sweet spot.)

It will therefore be appreciated that a training aid of the present invention can be much smaller than many existing training aids and can be much more portable. In preferred embodiments it is less than 50 cm long (e.g. less than 40 cm, less than 30 cm, or less than 25 cm long). Desirably it is less than 30 cm wide (e.g. less than 25 cm. less than 20 cm or less than 15 cm wide). It can of course be much smaller, as illustrated in the embodiments shown in Examples 1 to 12.

The training aid can be any appropriate shape, provided that it fulfils its function as a training aid in allowing a user to practice weight distribution in a manner that would allow the user to apply significant pressure to the sweet spot of a ski whilst skiing. The shape of the training aid can vary widely, commensurate with this function.

Various shapes of training aids according to one aspect of the present invention are illustrated in FIGS. 1 to 20 and described in Examples 1 to 12.

As discussed earlier, this is the less preferred aspect of the invention in which the training aid is inserted into the sole of the ski boot. It will therefore be appreciated that the training aid may, for example, comprise a balancing member in the general form of a sphere or a part (e.g. a section) thereof and may have attachment means in the forms of a screw projecting upwards. For example, the balancing member may be in the form of a sphere with upper and lower sections removed to expose generally flat upper and lower surfaces and may have a screw projecting upwards from the centre of the upper surface. As alternatives to using spheres/parts thereof as the balancing member, cylinders, frustoconical components, or parts of any of the aforesaid may be used.

In Examples 1 to 12 the balancing member has a generally flat upper surface that can abut the sole of a ski boot when the training aid is attached thereto. It can therefore act as a stop to prevent the training aid being screwed too deeply into the sole of the ski boot. A generally flat lower surface can be used for contacting flat ground and for balancing upon (e.g. upon floor boards or a paved, concrete or tiled area). Alternatively, the lower surface or a part thereof (e.g. edge portions) may be curved or bevelled. This can facilitate pivoting, whilst helping reduce the risk of damage to flooring.

As indicated above, although Examples 1 to 12 illustrate the invention and show relatively simple embodiments, they are not the most preferred ones. More preferably, the training aid comprises a base that is shaped to contact the sole of the ski boot without insertion into the ski boot and releasable attachment means for the base that releasably attaches it to the ski boot (as described earlier). This more preferred embodiment of the present invention is described in Example 13.

In this embodiment of the invention the balancing member can be in any appropriate form provided that it releasably attaches to the base of the training aid. It may be, for example, in the form of a block as illustrated in FIGS. 34 to 38, for example. Alternatively it may be in a similar form to the balancing members illustrated in FIGS. 1 to 20, with the main exception that it is releasably attached to the base of the training member, rather than being releasably inserted into the sole of a ski boot. Thus, for example, it may be in the general form of a sphere, a cylinder, a frusto-conical member, or a part (e.g. a section) of any of these.

Whatever the shape of the balancing member, generally speaking the larger the ground contacting surface area it has (when in use), the easier it will be to balance upon it.

In one embodiment of the invention several different training aids may be provided that provide different degrees of difficulty in balancing. These can be graded and can be used to progress from less advanced to more advanced training (e.g. from beginner/novice, to intermediate level, to advanced level or even to expert level).

Indeed, as the ground contacting surface of the training aid gets smaller and smaller, balancing skills can become more and more finely honed. Thus a training regime can be set up whereby once a user becomes proficient at balancing with a training aid having a relatively large ground contacting area this aid can be replaced with once with a slightly smaller ground contacting area, and so on.

Eventually the ground contacting area can become very small or even approximate a point. At this stage balancing skills will be extremely well developed. This can enable a user to balance in a manner that, if performed upon skis, would focus closer and closer to the sweet spot of the skis or even to the centre of said sweet spot.

It is not essential to use solid training aids or even solid balancing members. The training aids or parts thereof may be hollow (e.g. hollow spheres, cylinders, blocks, frustoconical shapes, or parts thereof), provided that they are sufficiently strong to bear a user's weight.

In some cases the ground contacting part may simply be a lower edge or periphery, as discussed later in certain examples. It is however more preferred that the ground contacting part is not simply an edge but provides an end face with a continuous surface (e.g. a planar or curved surface). It may, for example, be an end face of a balancing member in the form of a block.

The training aid, balancing member, or a part thereof may comprise any suitable material or combination of materials. These include plastics, metals alloys, composite materials (e.g. carbon fibre, fibreglass, laminates), etc. Natural materials (e.g. wood) may be used but are generally less preferred, at least for load bearing parts. Indeed it is preferred that a substantial part of the training aid (e.g. over 50% of the volume and/or weight thereof) is form of a plastics material. Engineering plastics materials that have high resilience and strength are preferred. These are known to those skilled in the art and include, by way of example, polyamides, polycarbonates, acrylonitrile butadiene styrenes (ABS), etc.

A wide variety of shapes, configurations and/or materials can be used provided that the training aid helps a user balance in a manner that if repeated on skis would assist the user in concentrating pressure upon the sweet spot.

It is important to note that although some skiers may have heard or read about the sweet spot and some may even understand where it is, a high proportion may have great difficulty in balancing on skis so as to focus pressure over the sweet spot. However, by repeated training using a training aid of the present invention, a user can become accustomed to applying increased pressure to the sweet spot, relative to other areas of a ski, until this becomes second nature. When such balancing is routinely performed during skiing, the user can appreciate how much easier many skiing manoeuvres and techniques will become.

The present invention therefore represents a major advance in the art of training skiers.

In addition to the training aid per se and to a combination of a ski boot (or other footwear) and the training aid, with the aid attached thereto, the present invention includes various methods.

It includes, for example, a method of training for skiing comprising wearing a pair of ski boots with a training aid of the present invention attached to each boot and balancing or attempting to balance upon said training aids in a manner so that the ski boots themselves do not contact the ground when a wearer of the boots is in the balancing position. As indicated earlier, in this position, the only part of a training aid of the present invention that contacts the ground is the balancing member, which is located underneath a ski boot.

The invention further includes a method comprising obtaining a ski boot and attaching a training aid of the present invention thereto so as to provide a combination as described earlier. Normally, a training aid would be attached to each boot of a pair of ski boots and training would be performed using said pair of boots with devices attached. This is of course also within the scope of the present invention.

The invention also includes various kits.

For example it includes a kit comprising a ski training aid or a balancing member of the present invention, said kit further comprising one or more of the following:
a) instructions for use in attaching a training aid to a ski boot and/or in removing it from the ski boot;
b) instructions for use in attaching a balancing member to a base of a training aid and/or in removing it from the base;
c) instructions for training when wearing a pair of ski boots with a training aid attached to each boot;
d) a tool for use in attaching a training aid to a ski boot and/or in removing it from the ski boot;
e) a tool for use in attaching a balancing member to a base of a training aid and/or in removing it from the base;
f) a floor protector;
g) a container for one or more of a) to f) above.

Preferred kits include a plurality of training aids or balancing members of the present invention. Thus, for example, there will normally be at least one pair of training aids or balancing members present in the kit. A plurality of pairs may be present.

In some cases the kit may comprise different sizes and or shapes of training aids or balancing members. As discussed earlier this can be useful in providing different degrees of difficulty in balancing and thereby can improve balancing skills. These may again be provided in pairs, with different pairs having different surface areas for balancing upon.

For example a pair of training aids intended for a beginner may each have a larger surface area at the base than would a pair of training aids for an intermediate skier. Similarly a pair of training aids intended for an intermediate level skier may each have a larger surface area at the base than would a pair of training aids for an advanced level skier. It is of course also possible to provide different training aids for different levels within a given category of skier.

A kit may further include one or more of the following:
a) a pair of skis
b) a pair of ski boots
c) a pair of ski poles
d) ski gloves
e) ski goggles
f) ski clothing
g) a ski training manual.

Thus, for example, a manufacturer, seller or distributer of ski-related merchandise may be persuaded to include one or more pairs of training aids of the present invention as part of a sales package. This can provide an additional incentive for potential purchasers.

It is envisaged that there will be a large demand for training aids of the present invention from ski resorts, ski shops, ski training centres and from skiers at a wide variety of levels from beginner through to intermediate and even advanced level. They can of course be used by individuals seeking to improve their own posture/balance for skiing, but can also be used as teaching or demonstration aids.

Ski training aids of the present invention are preferably much more portable than many prior art ski training aids. Thus they can be easily transported.

They may be used on their own or as part of a wider training program. For example may help to practice or develop techniques taught during skiing lessons.

Thus the ski training aids of the present invention provide many important advantages.

BRIEF DESCRIPTION OF THE DRAWINGS

The invention will now be described by way of example only, with reference to the drawings, in which corresponding reference numbers indicate corresponding components.

FIGS. 20 to 38 and Example 13 indicate a preferred development in which it is not necessary to insert any part of the training device into the sole of the ski boot, or indeed to modify the structure of the ski boot in any other way. Thus the ski boot remains unmodified, apart from having a training aid releasably attached thereto in a non-invasive manner.

Figure 1:
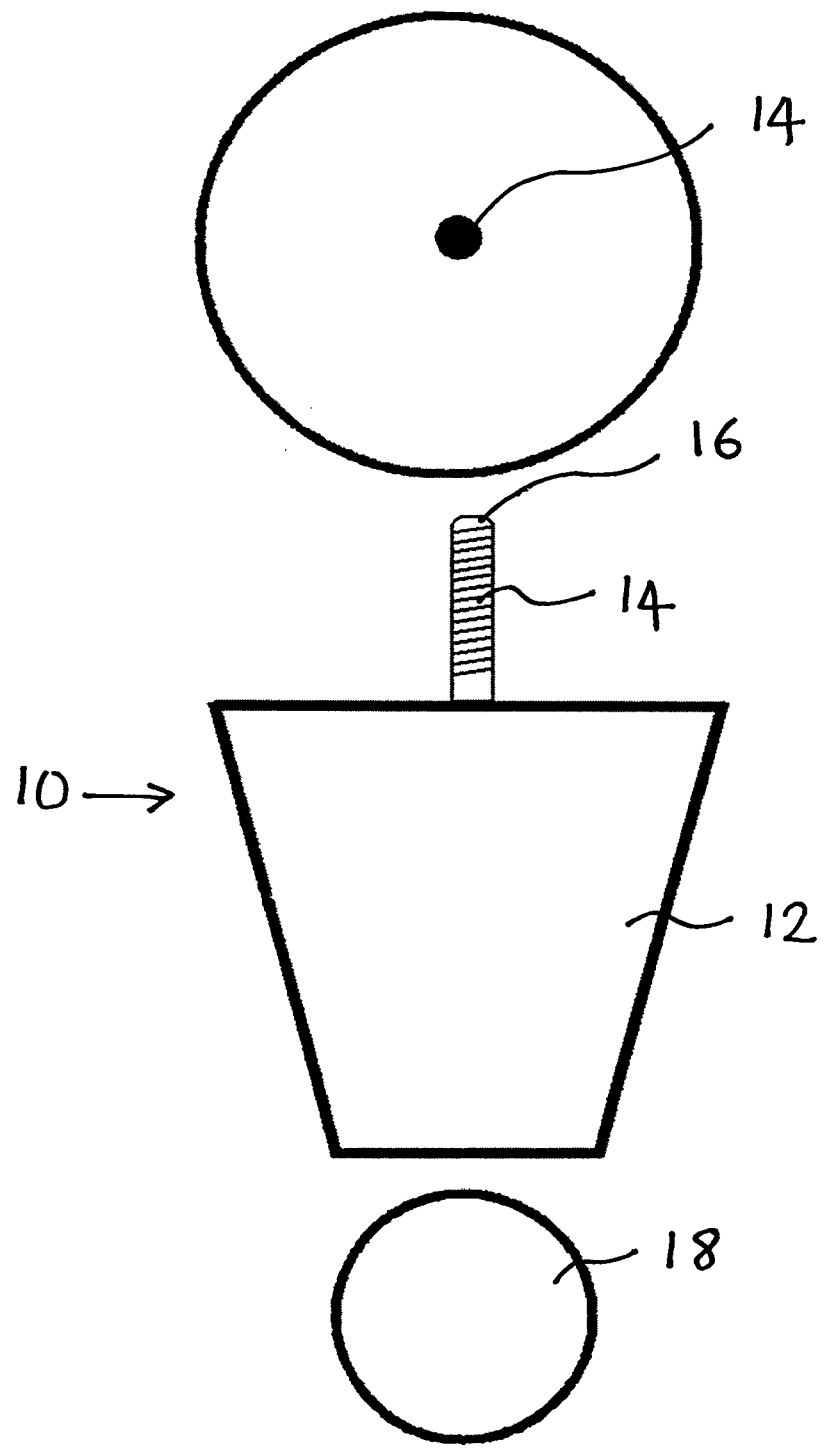
FIGS. 1 to 19 and Examples 1 to 12 illustrate the initial concept devised by the present inventor involving insertion of part of the training device (here a screw thread) into the sole of the ski boot.

Turning now to the specific figures:

FIG. 1 show a first ski training aid of the present invention; with a view taken from above shown at the top of the figure, a side view shown in the middle of the figure and a view from below shown in the lower part of the figure.

FIGS. 2 to 12 show second to twelfth ski training aids of the present invention respectively; again with a view taken from above the ski training aid shown at the top of the relevant figure, a side view shown in the middle of the relevant figure and a view from below shown in the lower part of the relevant figure.

Figure 11:
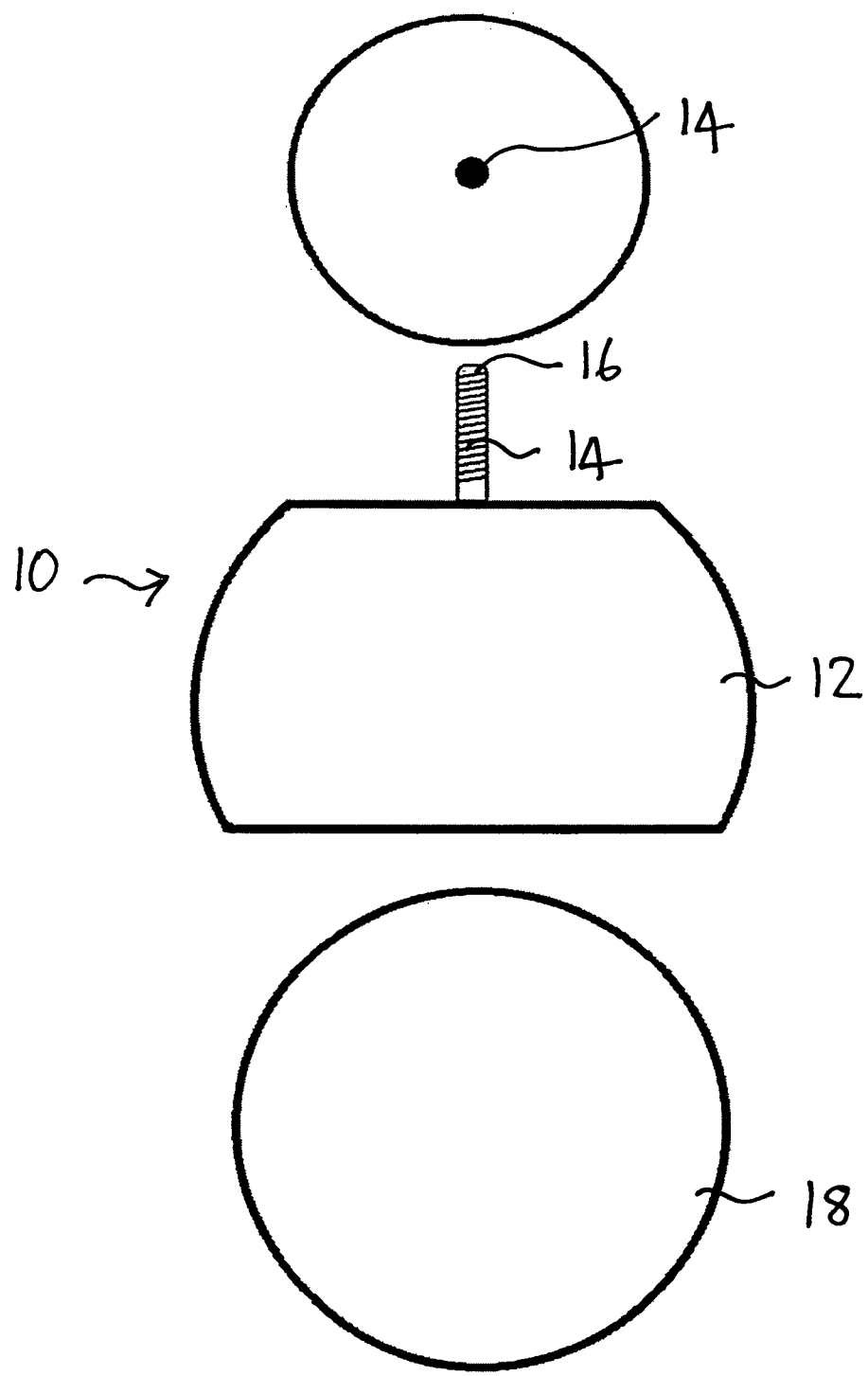
Figure 12:
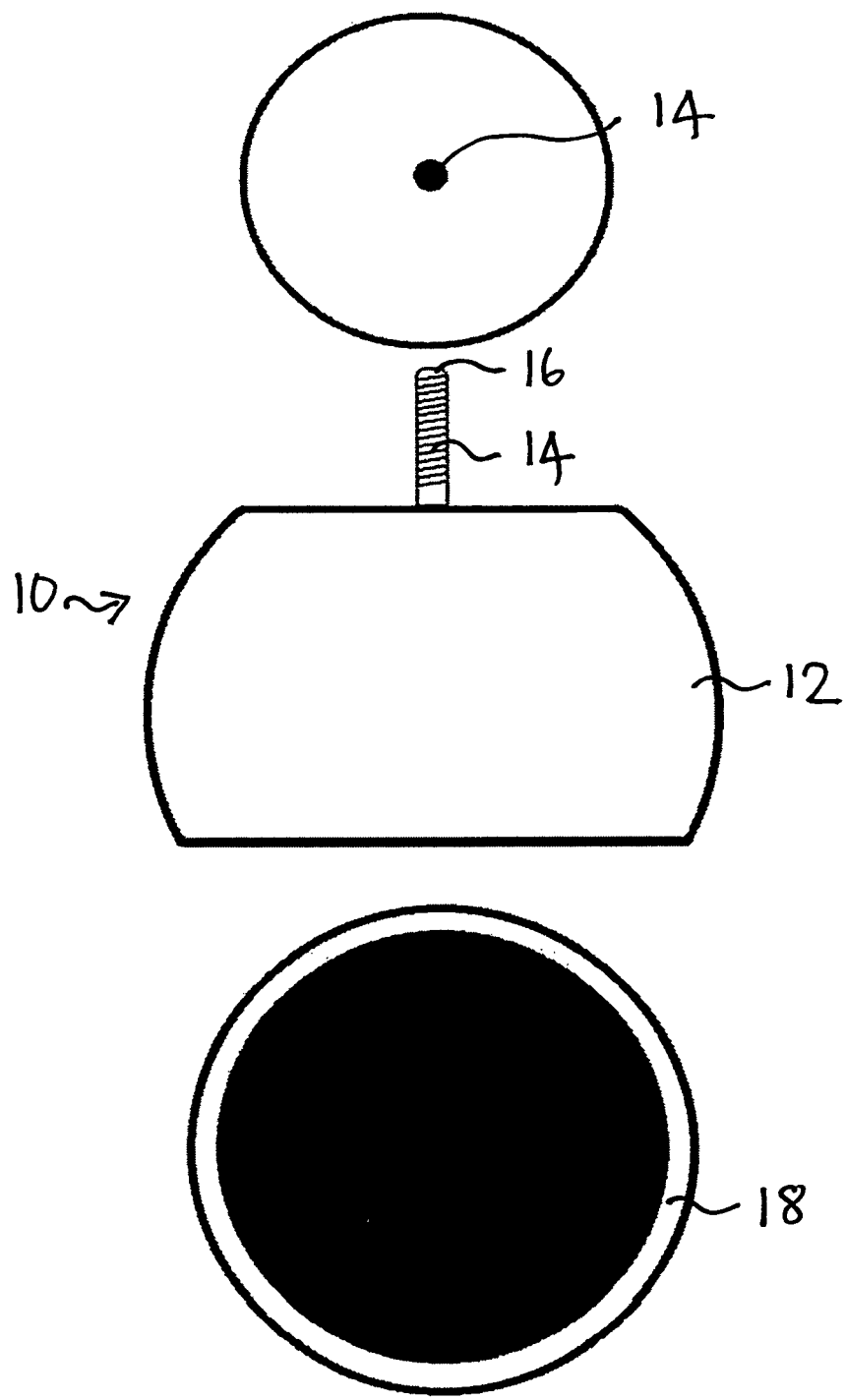
Figure 13:
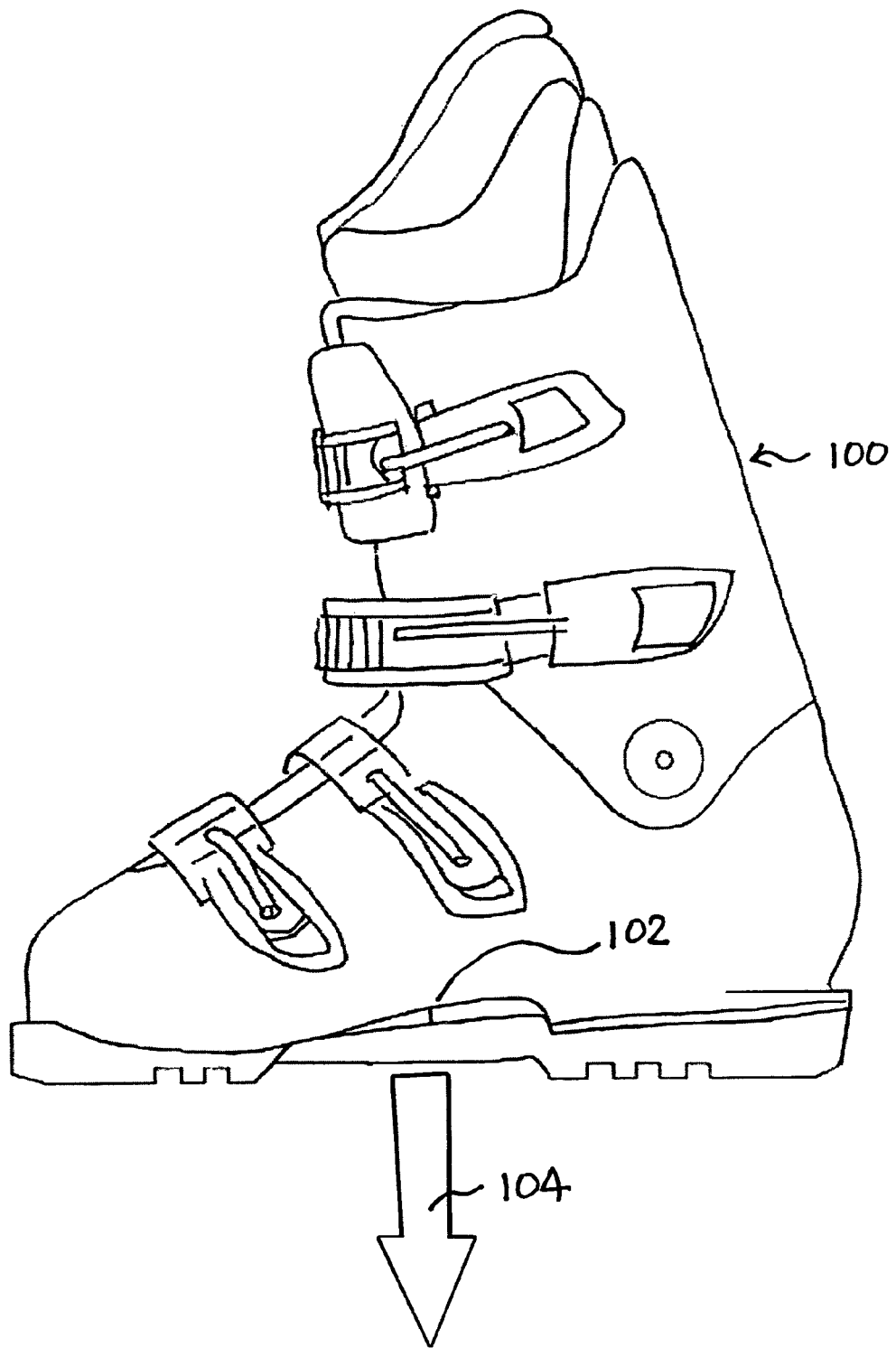

FIG. 13 shows a side view of standard ski boot that can be used in combination with a ski training aid as illustrated in any of FIGS. 1 to 12.

Figure 14:
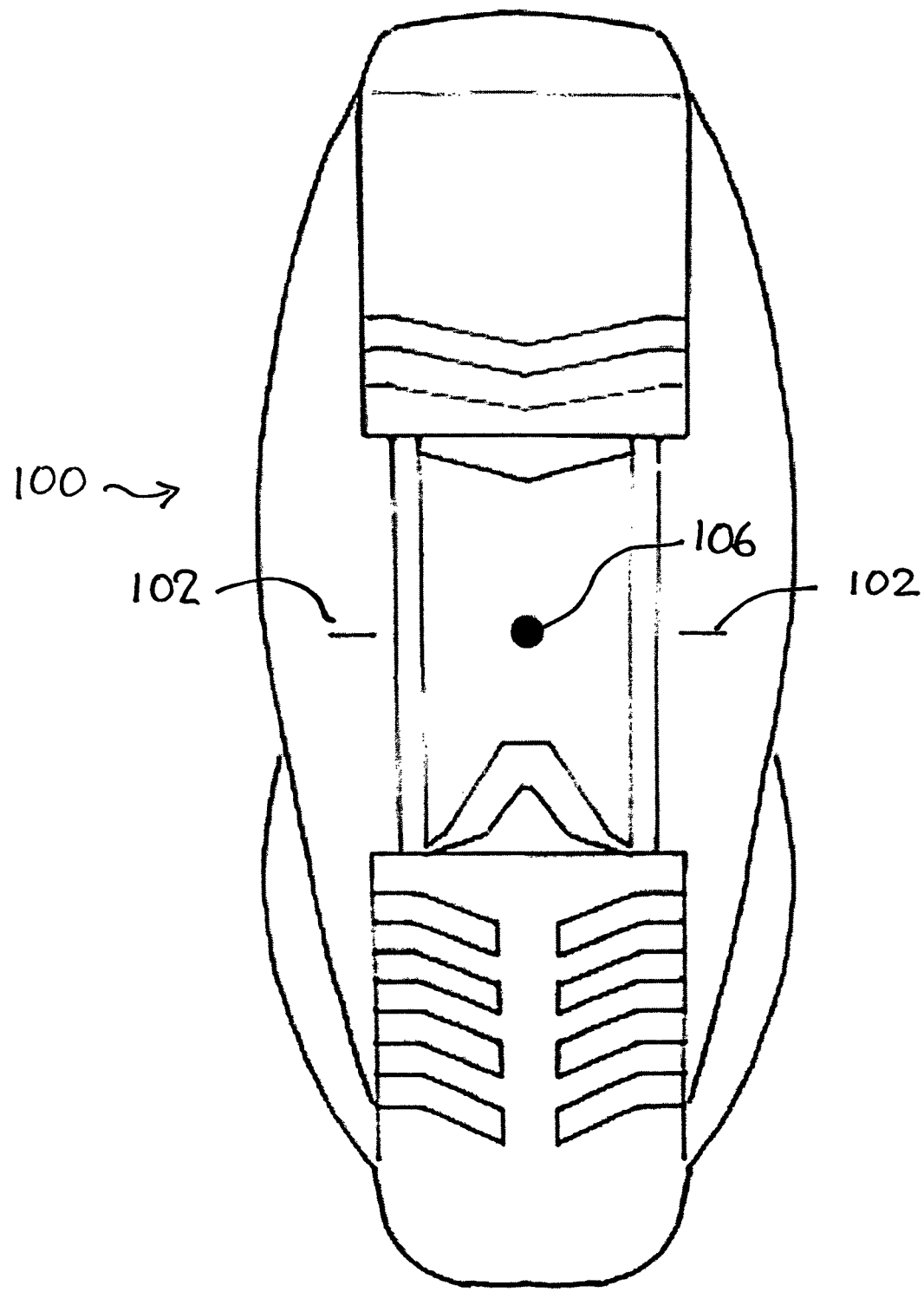

FIG. 14 shows the ski boot shown in FIG. 13, when viewed from below.

Figure 2:
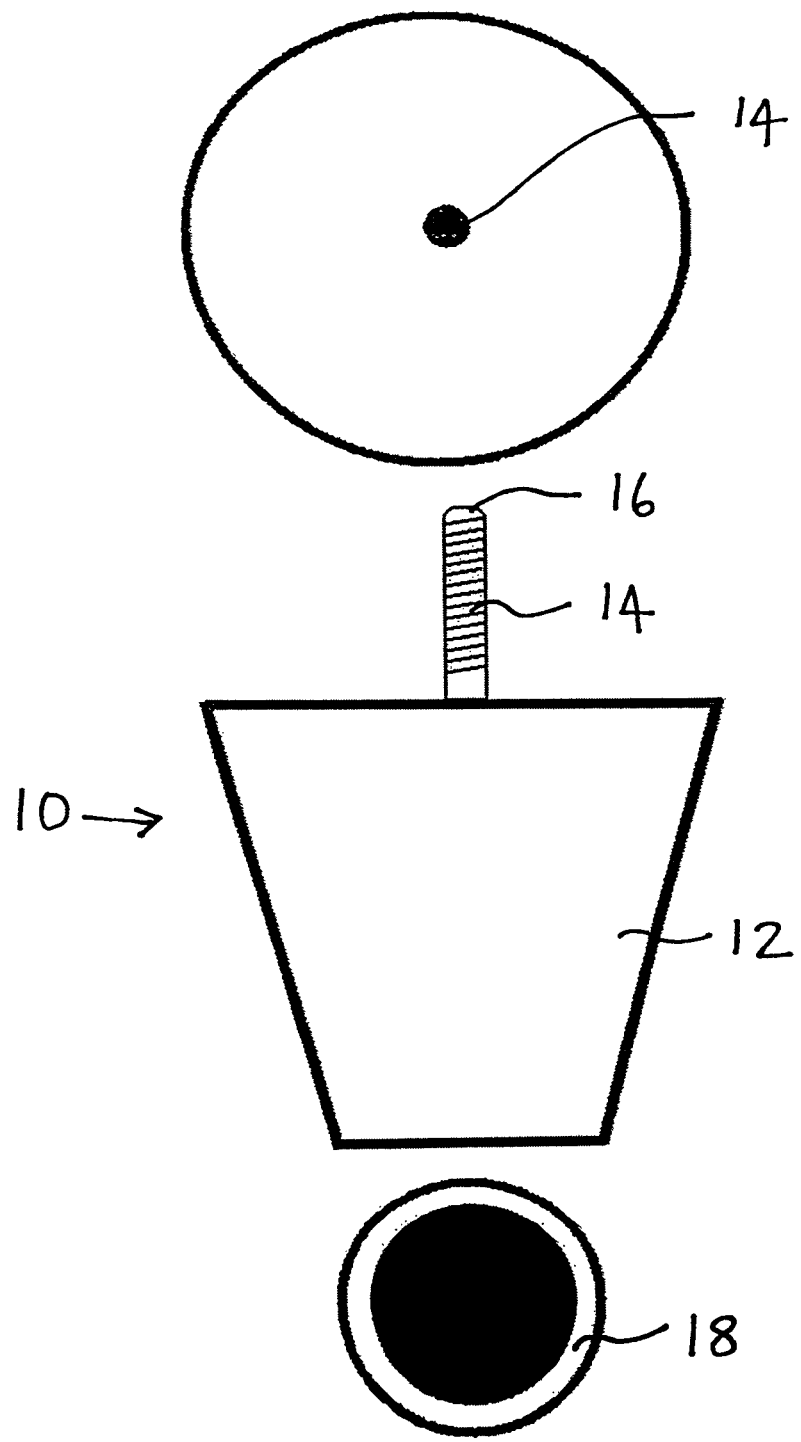
Figure 15:
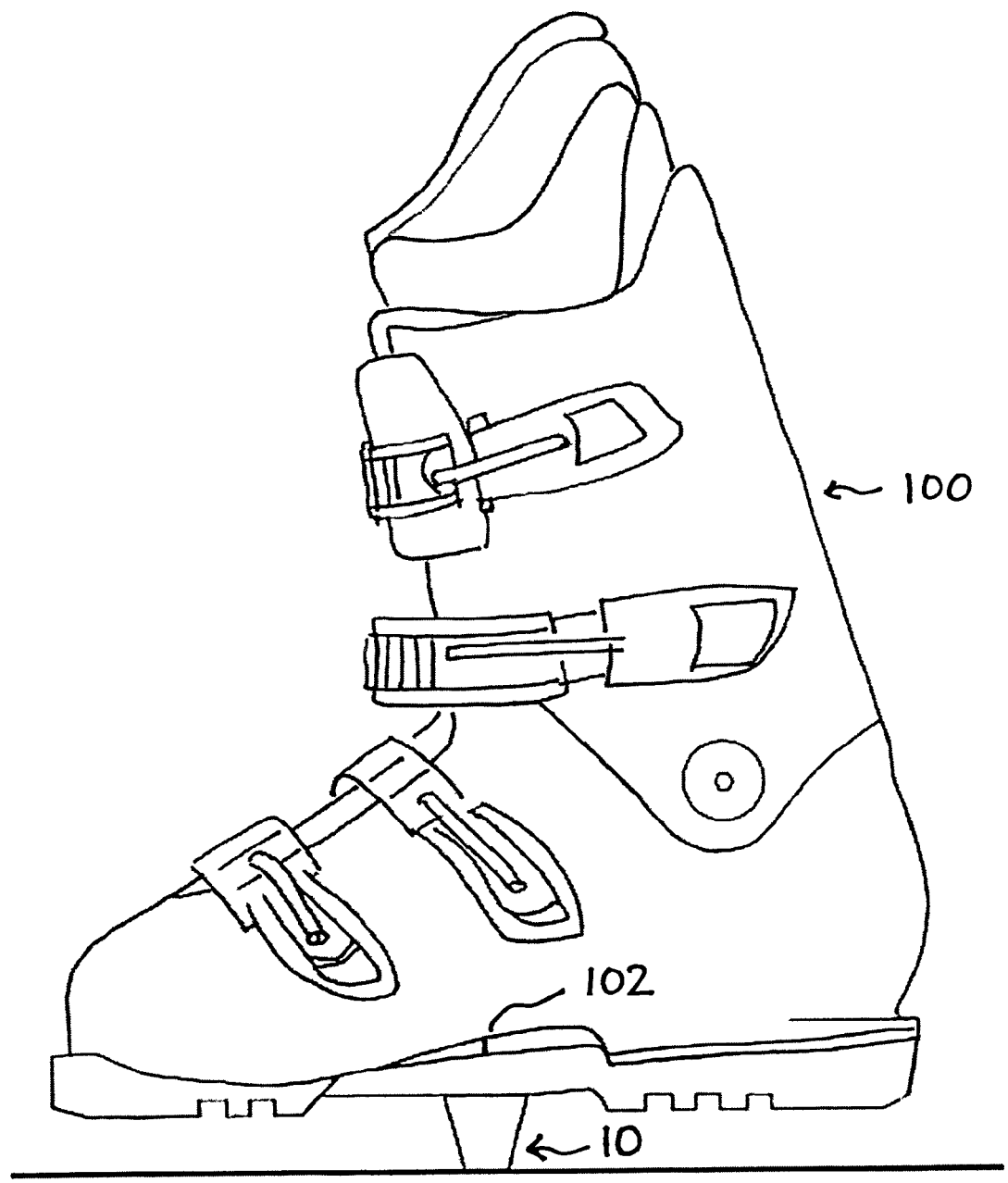

FIG. 15 is a side view showing the ski boot illustrated in FIGS. 13 and 14 with the training aid illustrated in FIG. 1 or 2 attached thereto.

Figure 3:
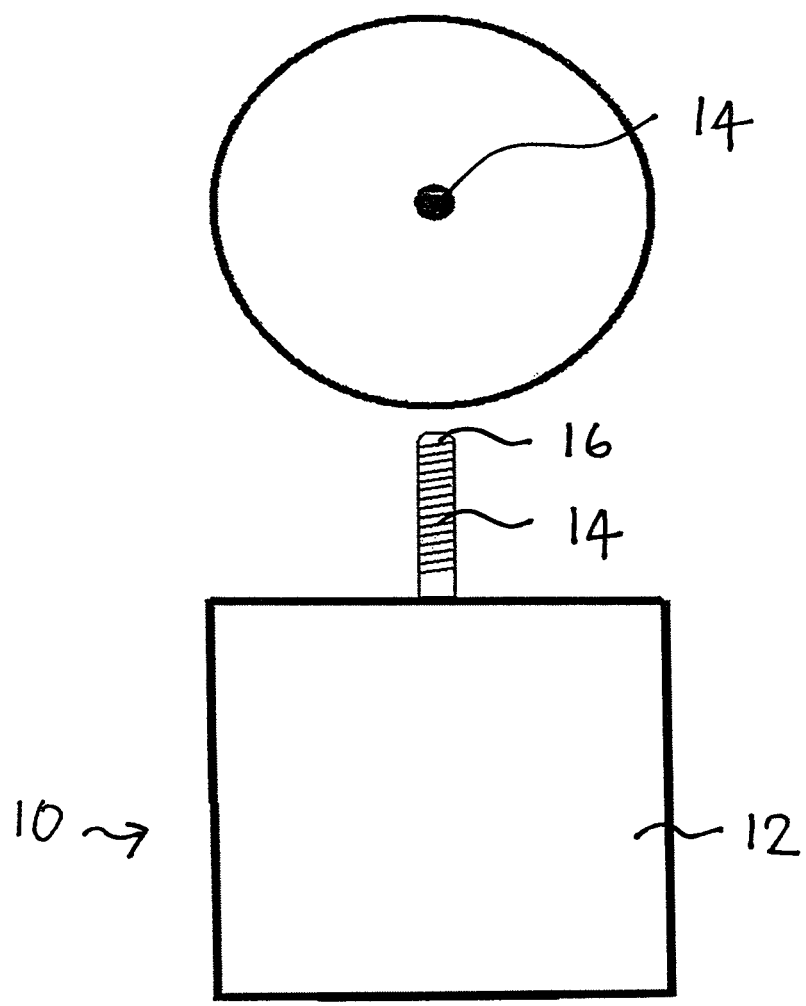
Figure 4:
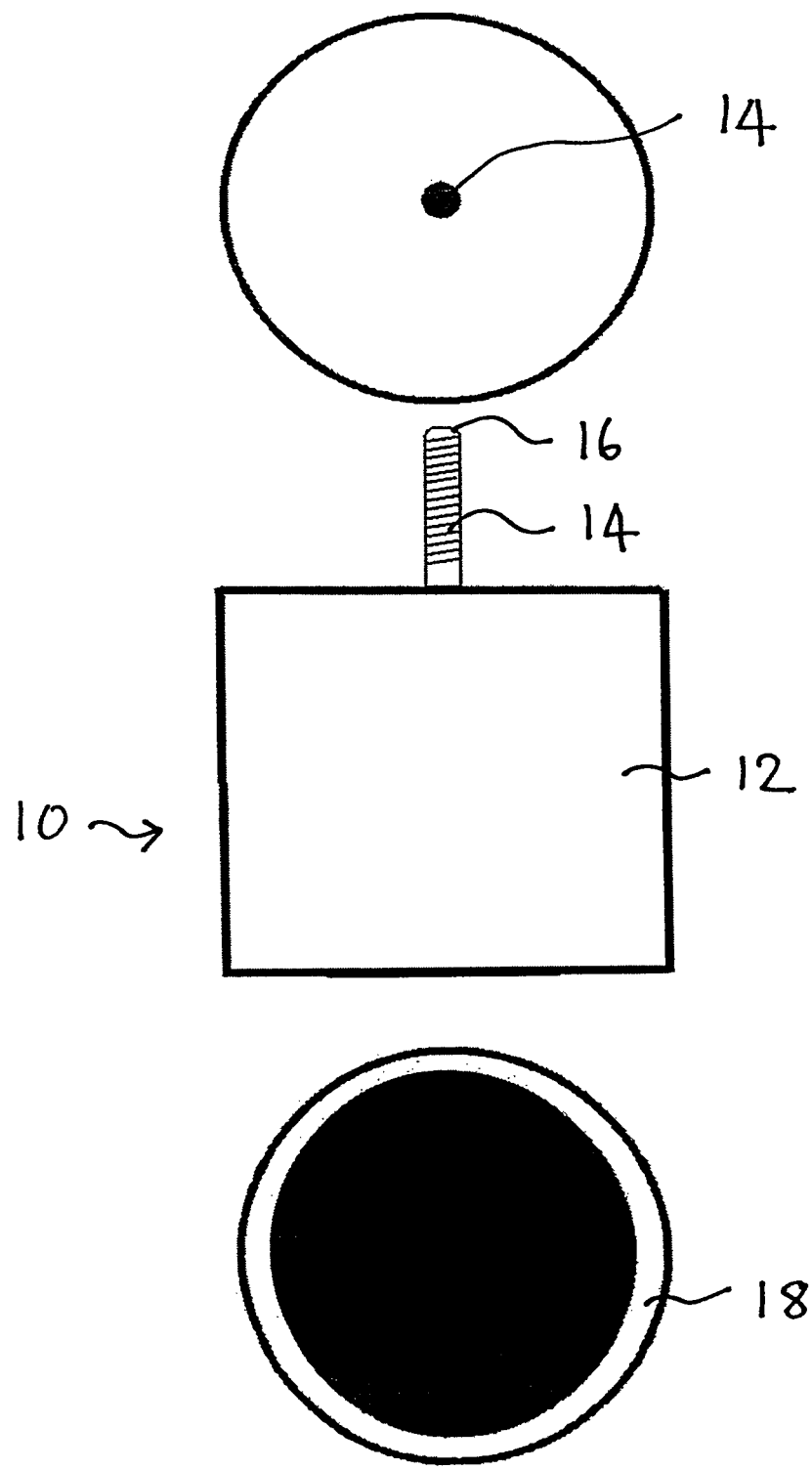
Figure 16:
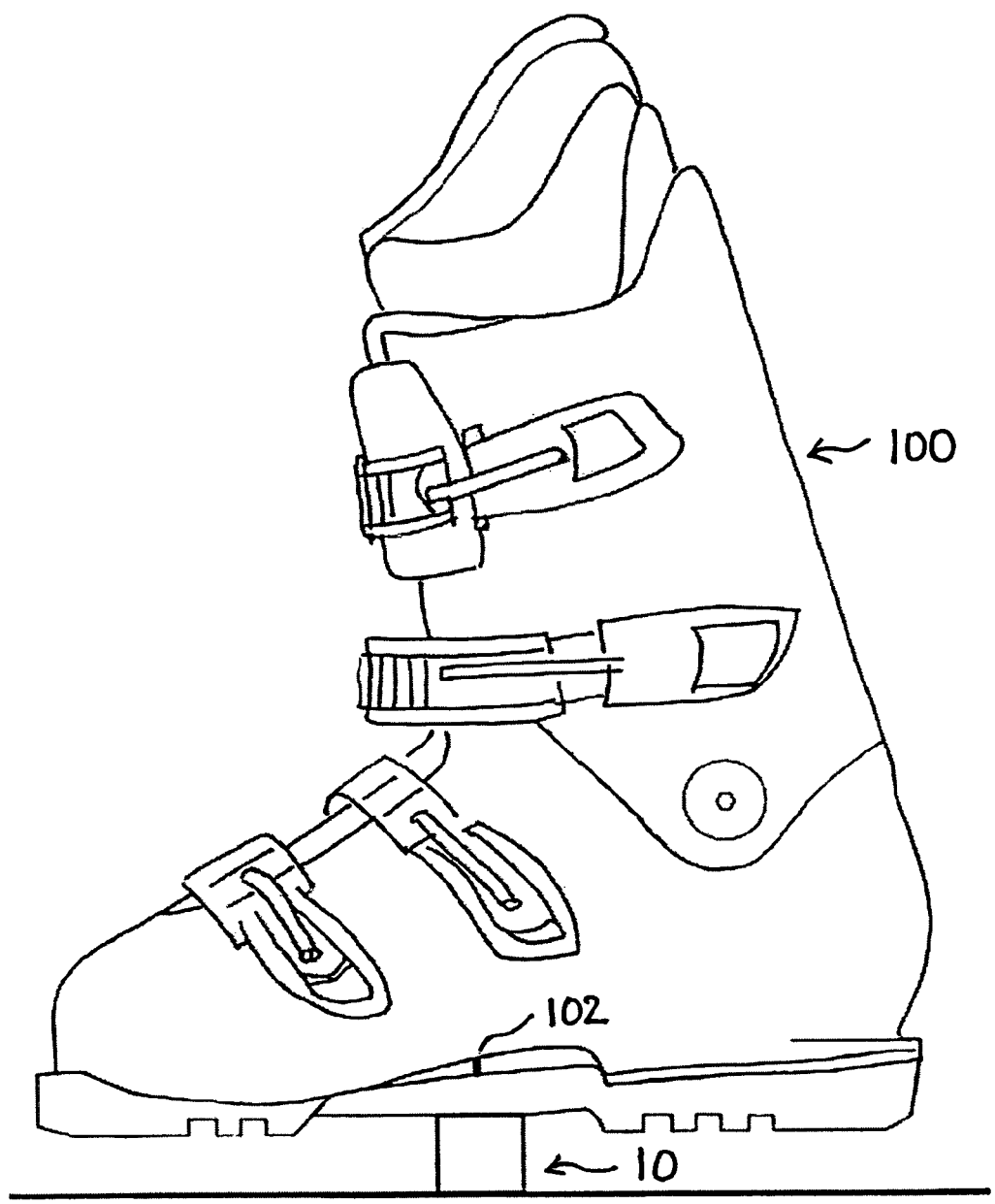

FIG. 16 is a side view showing the ski boot illustrated in FIGS. 13 and 14 with the training aid illustrated in FIG. 3 or 4 attached thereto.

Figure 5:
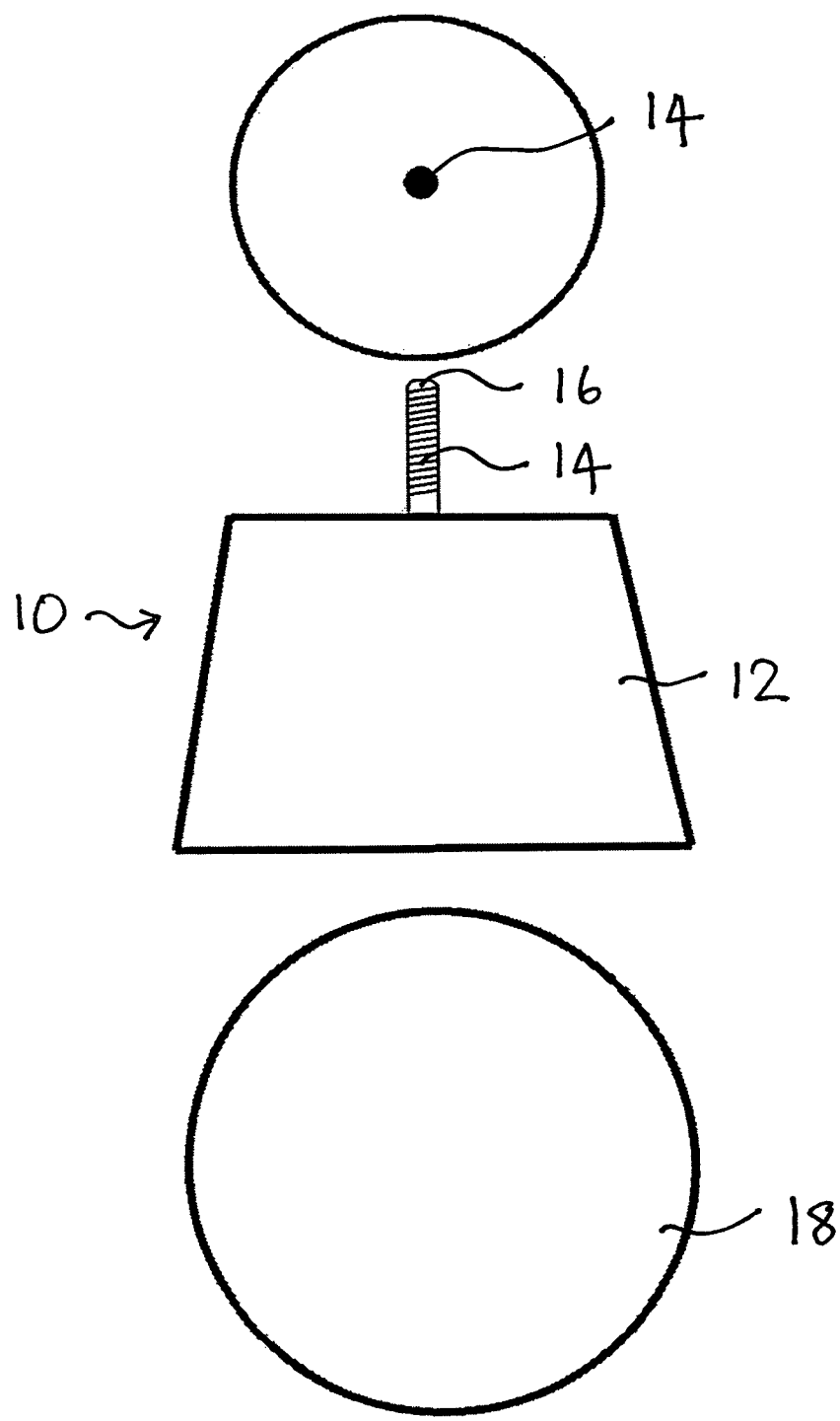
Figure 6:
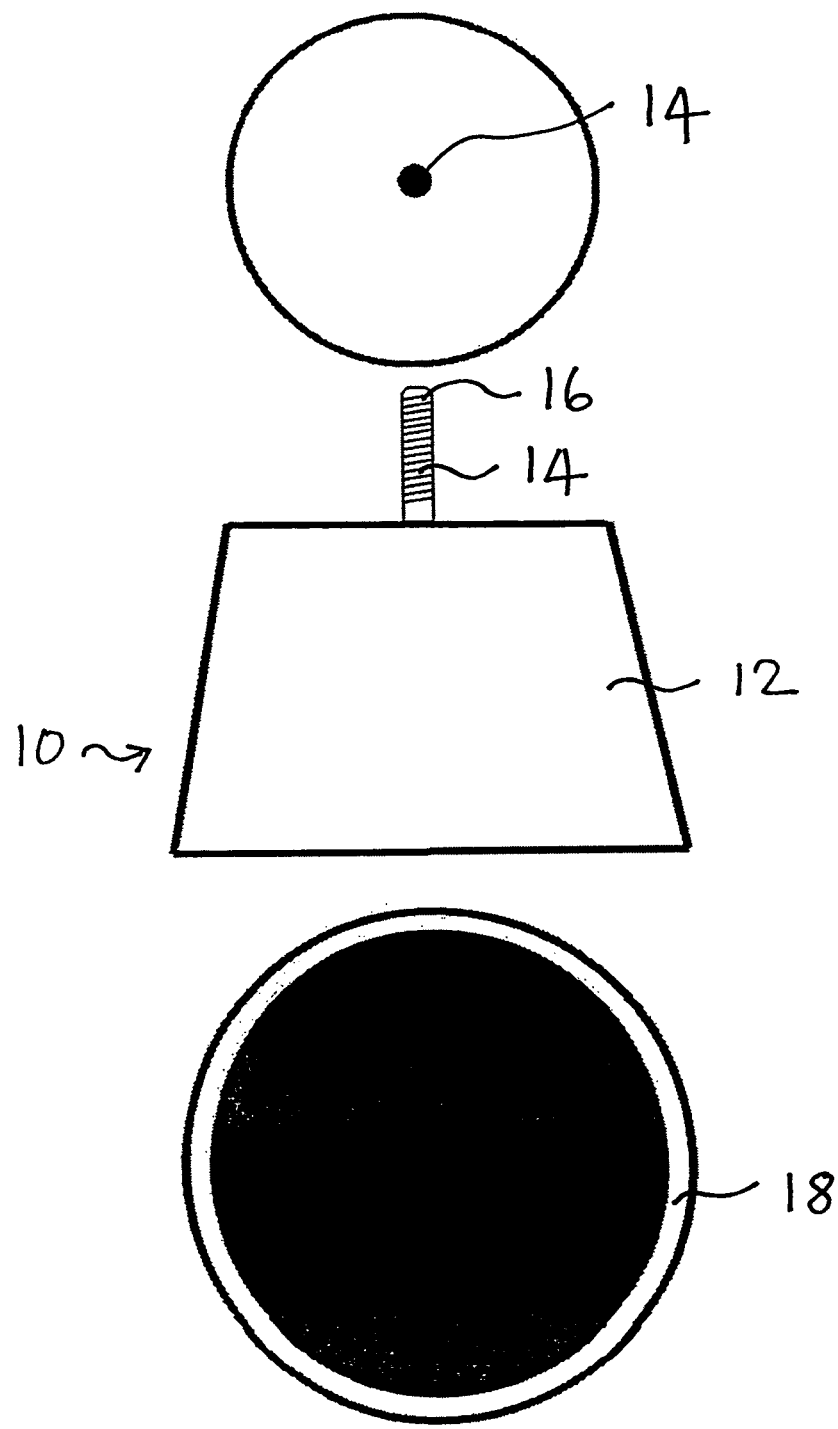
Figure 17:
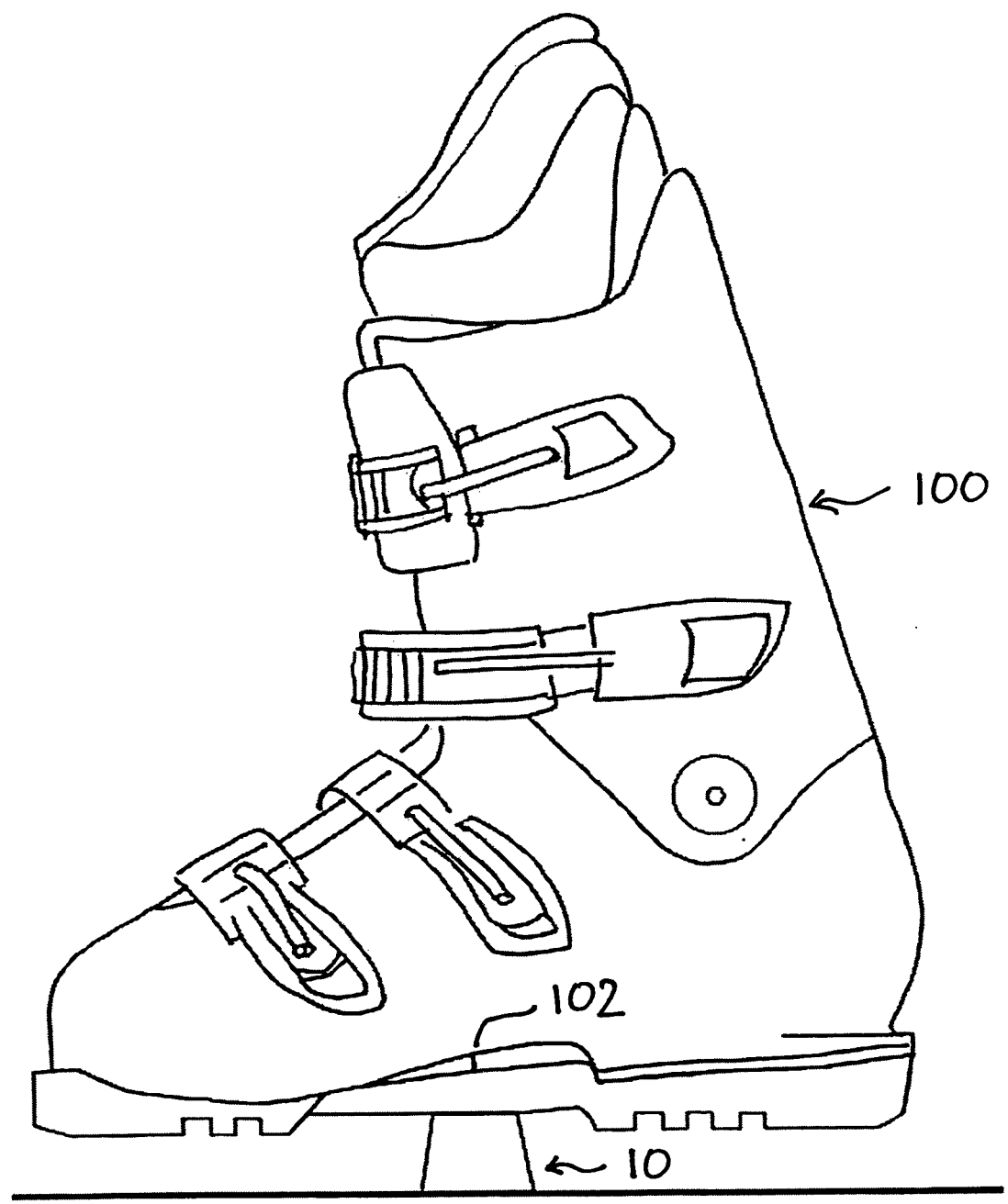

FIG. 17 is a side view showing the ski boot illustrated in FIGS. 13 and 14 with the training aid illustrated in FIG. 5 or 6 attached thereto.

Figure 7:
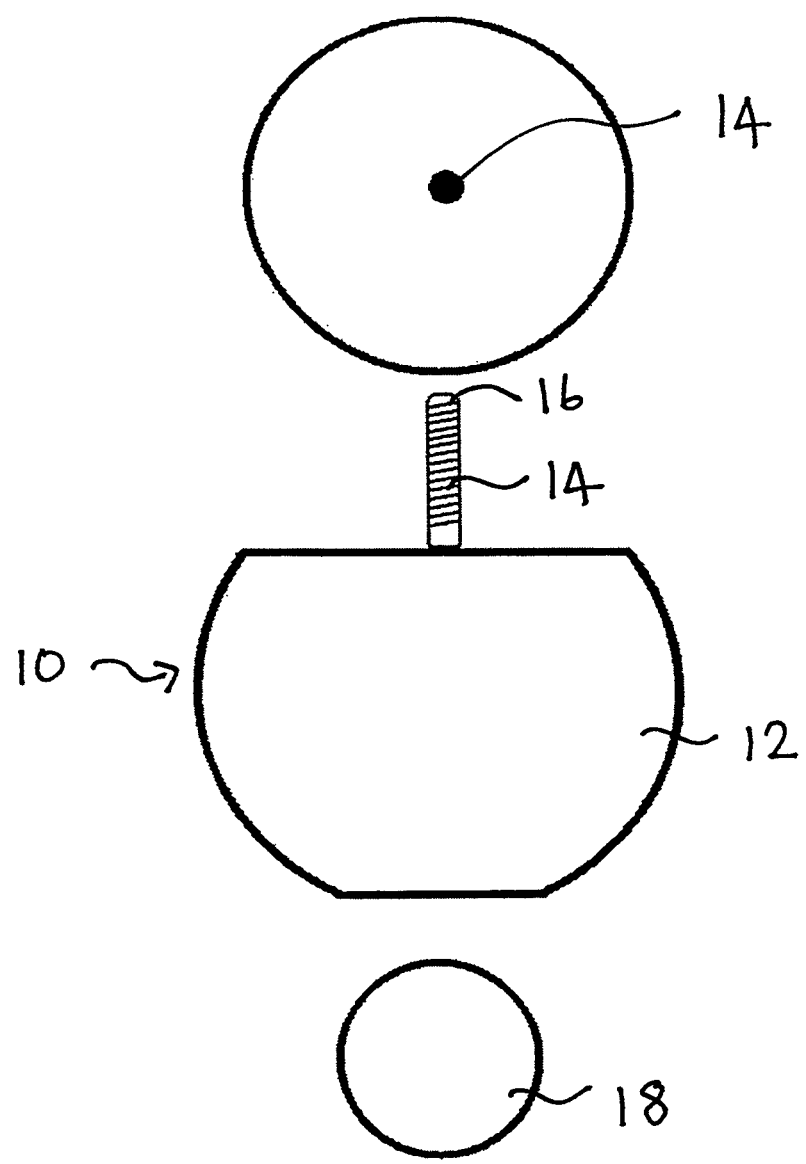
Figure 8:
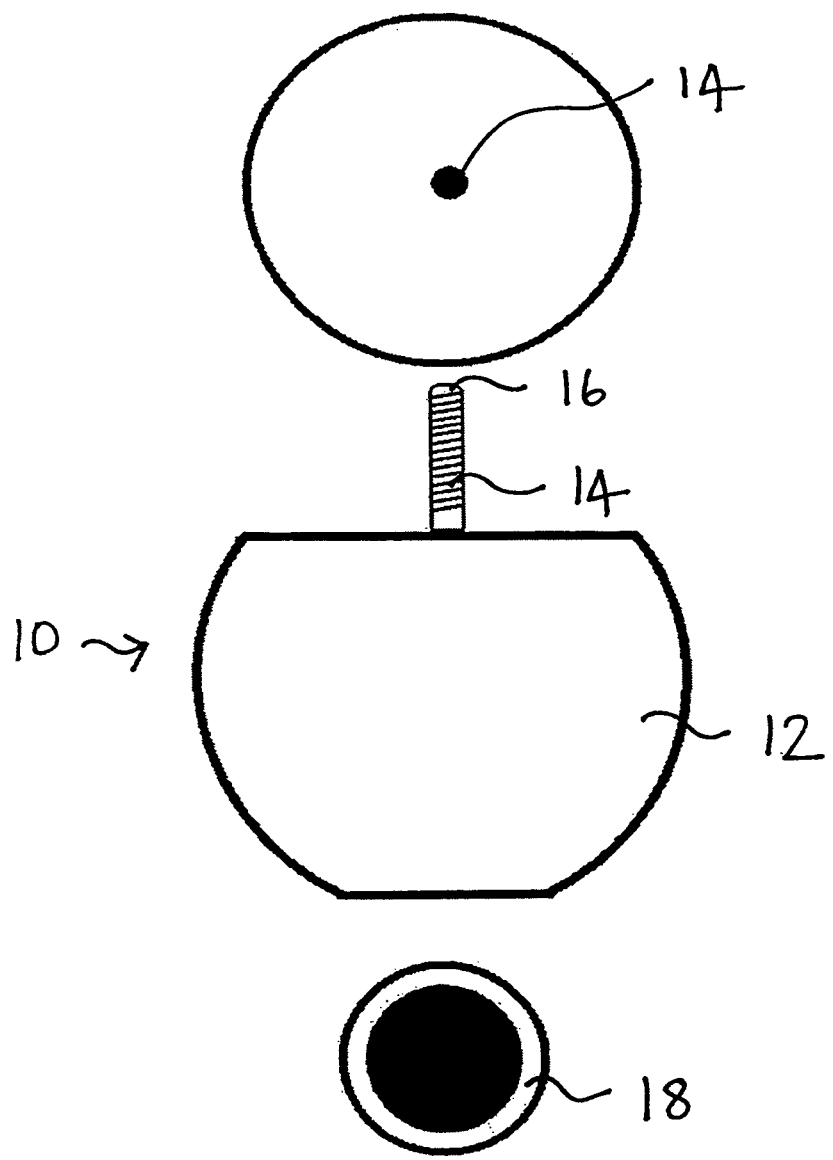
Figure 18:
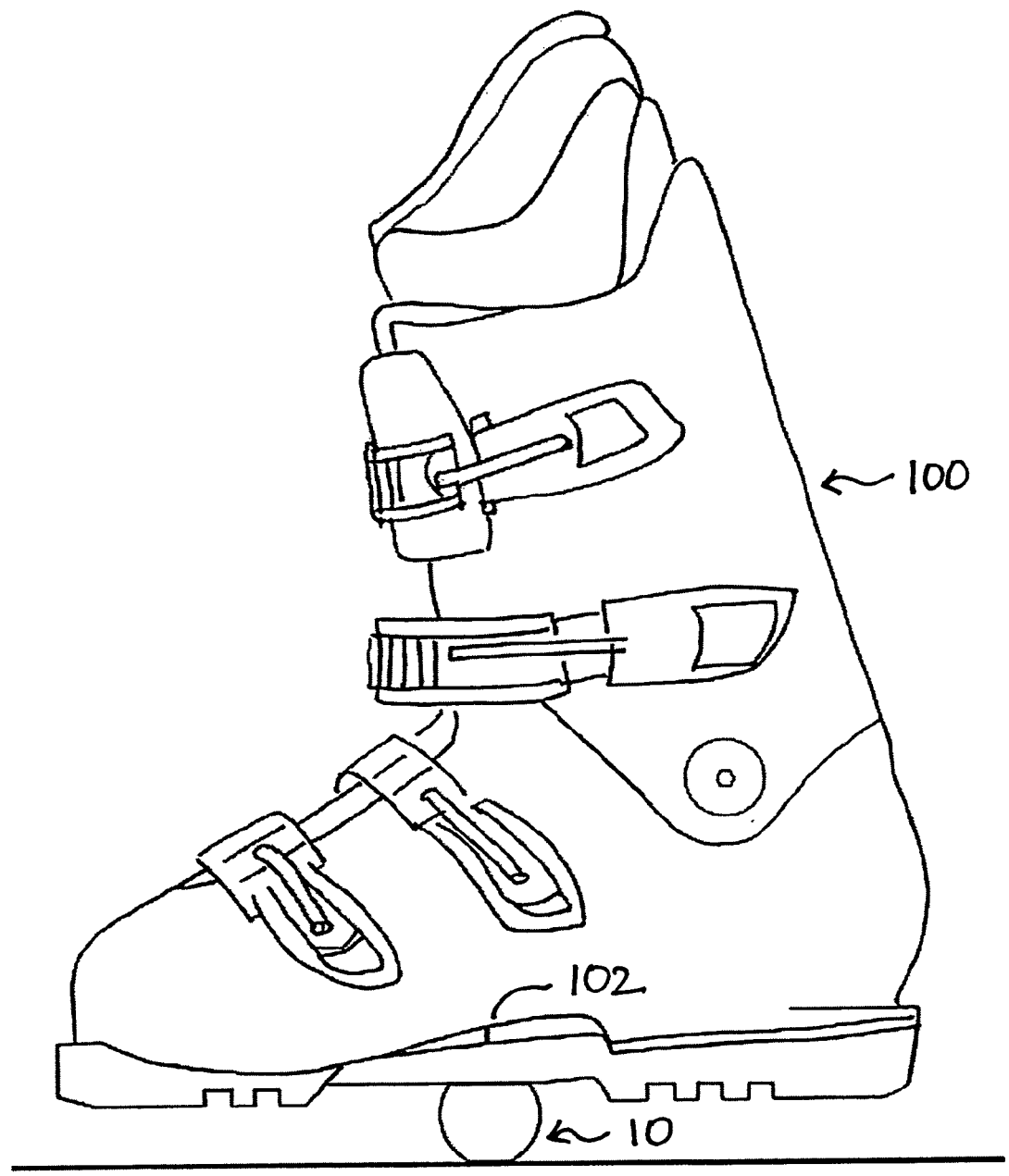

FIG. 18 is a side view showing the ski boot illustrated in FIGS. 13 and 14 with the training aid illustrated in FIG. 7 or 8 attached thereto.

Figure 9:
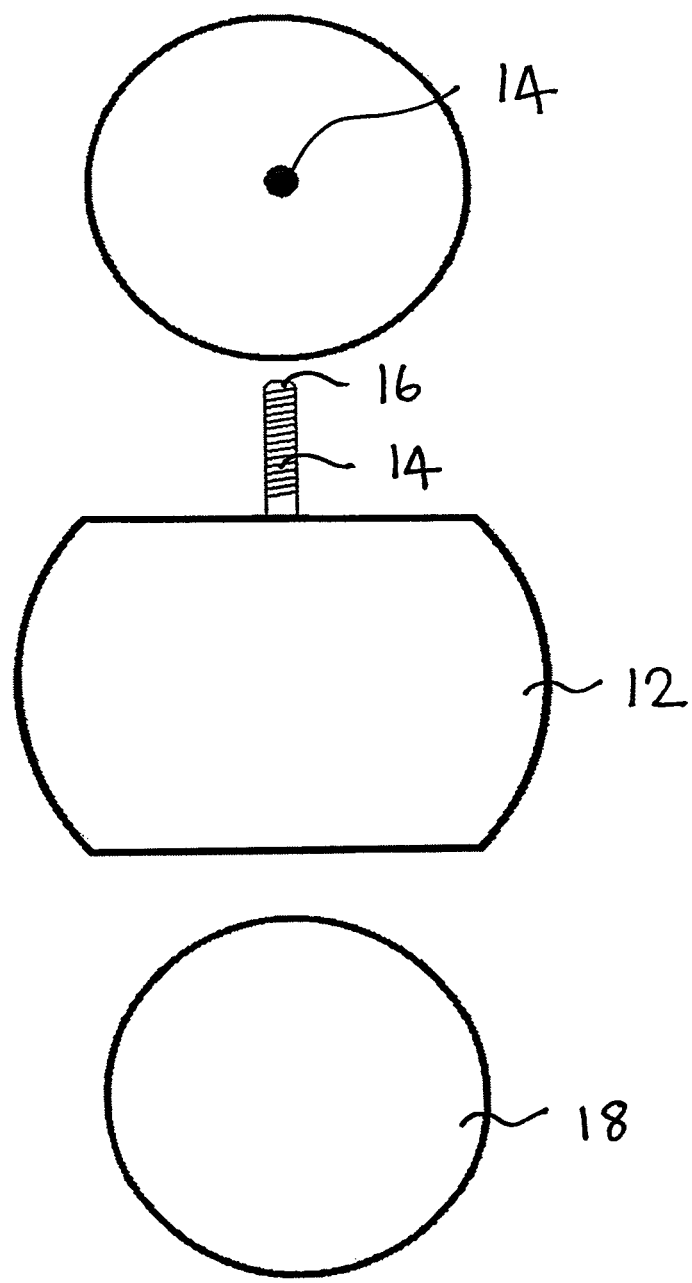
Figure 10:
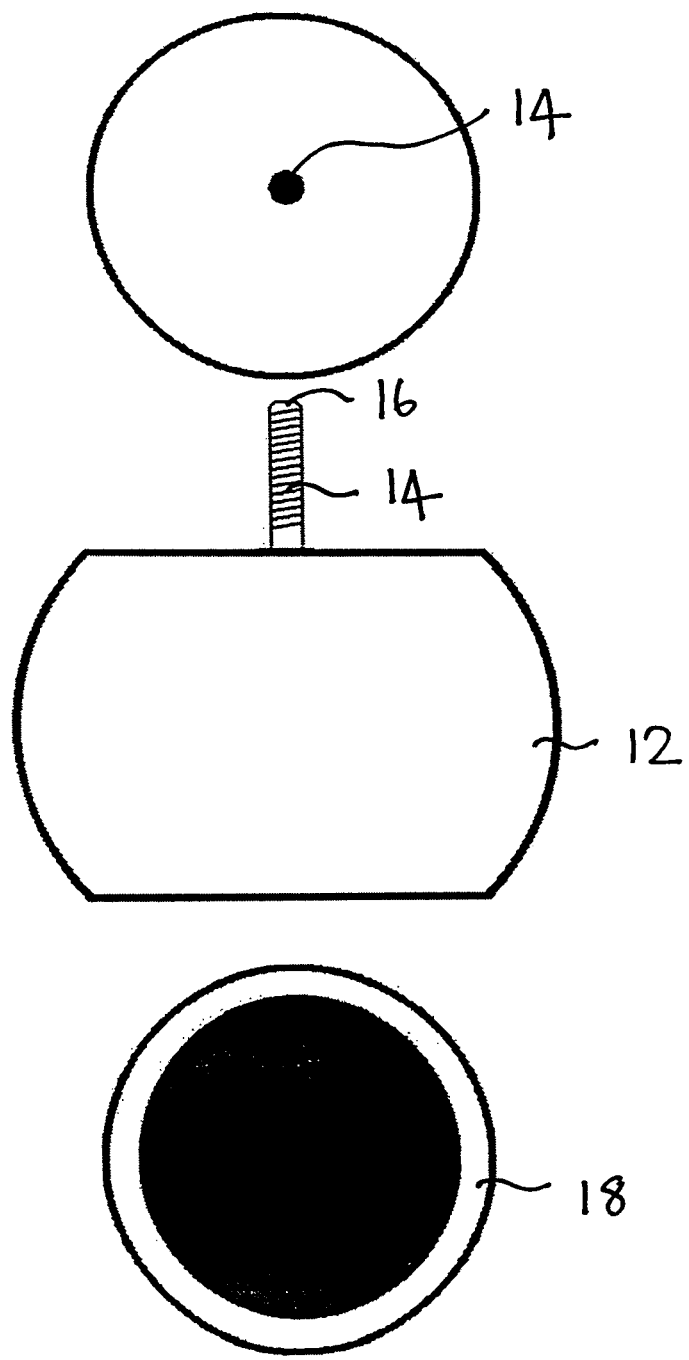
Figure 19:
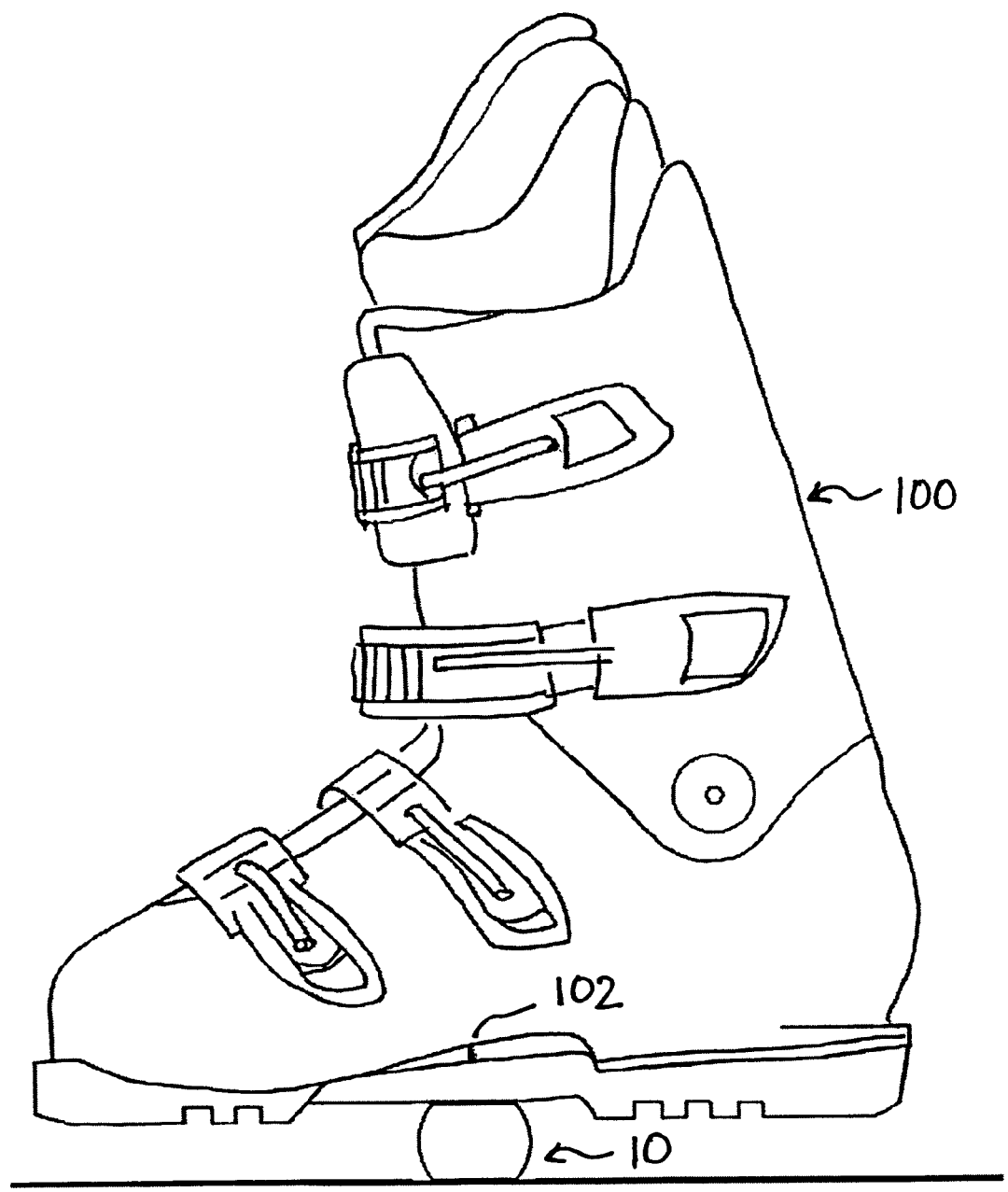

FIG. 19 is a side view showing the ski boot illustrated in FIGS. 13 and 14 with the training aid illustrated in FIG. 9 or 10 attached thereto.

Figure 20:
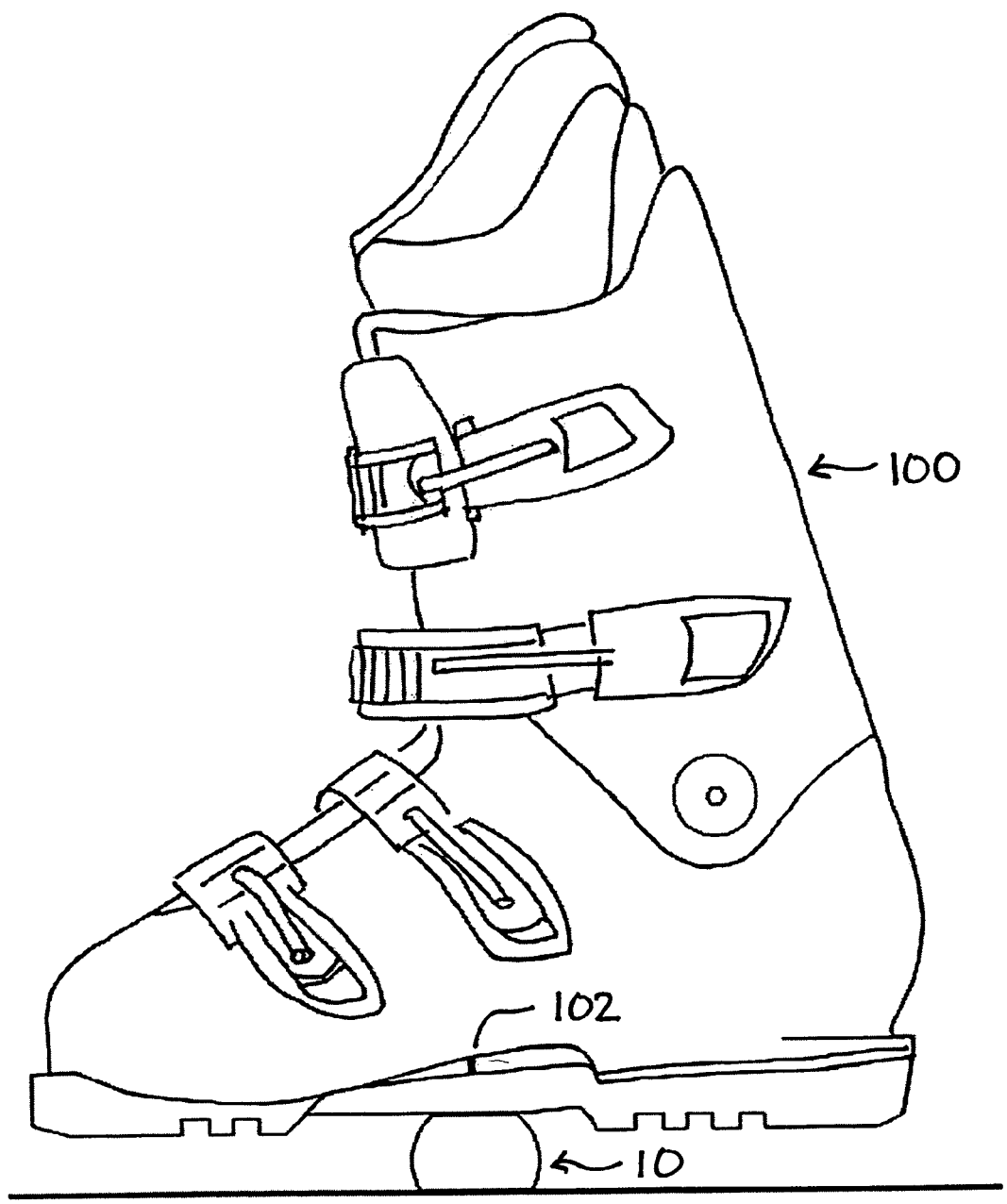

FIG. 20 is a side view showing the ski boot illustrated in FIGS. 13 and 14 with the training aid illustrated in FIG. 11 or 12 attached thereto.

FIG. 21 shows a perspective view of an alternative training aid of the present invention relative to the training aids illustrated in FIGS. 1 to 20. Here the training aid is a right training aid designed to be strapped to a right ski boot. The view shown is from the front and to one side of the training aid, with a heel strap projecting rearwardly into the paper and a toe strap projecting out of the paper.

FIG. 22 is similar to FIG. 21, but with the alternative training aid turned through 180°. Thus the heel strap projects out of the paper and the toe strap projects into the paper.

FIG. 23 show the training aid shown in FIG. 22 when turned on its side to show a perspective view of the base of the training aid with a balancing member attached thereto.

FIG. 24 shows a plan view of the alternative training aid shown in FIGS. 21 to 23.

FIG. 25 shows a side view of the alternative training aid shown in FIGS. 21 to 23.

FIG. 26 shows a front view of the alternative training aid shown in FIGS. 21 to 23.

FIGS. 27 to 30 show comparative views of the alternative training comprising a range of different balancing members fitted to the base. The balancing members get smaller from FIG. 27 through to FIG. 30, thereby providing an increasing degree of difficulty in balancing FIG. 31 shows an exploded view of the alternative training aid illustrated in FIG. 30 so that individual components can be seen more clearly.

FIG. 32 shows a top view of foot plate used in forming the base of the alternative training aid. Here the foot plate is shown prior to assembly of the base and is in precursor form.

FIG. 33 shows a view of the foot plate shown in FIG. 32, when seen from the underside.

FIGS. 34 to 37 show the balancing members illustrated in FIGS. 27 to 30 respectively, when removed from the base.

FIG. 38 shows the alternative training aid attached to a ski boot, when viewed from one side.

DETAILED DESCRIPTION OF THE INVENTION

For ease of reference, in the following examples the present invention has been discussed with reference to training aid being attached to a ski boot and being used to balance in a manner that mimics balancing upon the sweet spot of a ski. It will of course be appreciated that in practice a pair of ski boots (left and right) would be used, a training aid being attached to each boot.

It will also be appreciated that each ski (left and right) will have a sweet spot and that weight distribution between the sweet spots of the two skis can vary, as discussed earlier. Thus it is not essential that the ski training aids described in the examples are used to practice techniques that when skiing would apply equal pressure to each sweet spot.

It is however desired that more pressure is applied to the sweet spot of each ski than to other parts of the ski, e.g. than is applied o other parts of equivalent size to the sweet spot but at different locations along the ski.

Example 1

A First Ski Training Aid of the Present Invention

A first ski training aid 10 of the present invention is in a form similar to that of a stud used in football or other sports (although the exact size and shape can differ).

It is illustrated in FIG. 1 and can be attached to a ski boot as shown in FIG. 13 or 14 to provide a combination as illustrated in FIG. 15 that allows a wearer of the boot to train to exert pressure at a region that would correspond to the sweet spot of a ski, as described later on in further detail.

It can be seen that the first training aid 10 comprises a frustoconical main body 12 (which functions as a balancing member) and a screw thread 14 that protrudes upwardly from said main body 12.

In this example and in the other examples the main body 12 is preferably formed of a strong and resilient plastics material. A polyamide material (e.g. a polyamide known as "PA6"™, or "Nylon 6"™) is preferred. The screw 12 is a resilient steel screw.

In the embodiment shown in FIG. 1 the screw thread 14 has a rounded top 16. This can be inserted into an aperture that has already been formed in the sole of a ski boot, e.g. with a bradawl, a screw, or another aperture forming instrument.

In some cases the sole of the ski boot may be specially adapted for receiving a screw thread 14 or other insertion means, e.g. by having a corresponding socket at the relevant position, which may have complementary screw threads. This is not however essential. Indeed it is envisaged that the training aid 10 will be attached to a standard ski boot in most cases.

It is of course possible to provide a screw 14 (or other insertion means) with a pointed top. This can be used to insert the first training aid 10 into the sole of a ski boot without requiring a pre-formed aperture or socket to be present.

The body 12 of the first training aid 10 can be formed of any suitable material that is capable of bearing the weight of person without becoming damaged. Thus, for example, plastics materials, metals, metal alloys, composite materials (e.g. carbon fibre composites), etc may all be used.

Indeed in some cases a material allowing a degree of deformation may be used for the body 12 or for part thereof (e.g. a rubber or synthetic rubber material may be used). This can be used if the first training aid 10 is to be used indoors and it is desired to protect a floor for example. It is also possible to provide coating/outer layer for similar purposes.

If, as in this embodiment, a part of the first training aid 10 is designed to be inserted into the sole of a ski boot (here the screw thread 14), then this will normally be formed of a harder material than the material from which the ski boot sole is formed material. It may for example be a hard metal or metal alloy, although there are of course many other possibilities including composite materials, plastics or even hardwoods/laminates.

In many cases the part 14 of the first training aid 10 used for attachment to a ski boot will be formed from a different material than the body 12 of the training aid 10 that is used for balancing. However this is not essential. For example it is possible to provide a first training aid 10 formed from a single material. This may be done by moulding, casting, shaping, carving, etc.

The first training aid 10 described in this example and illustrated in FIG. 1 can be seen to have a flat circular base 18. This base 18 provides a useful surface for attempting to balance upon. It has a relatively small surface area compared to the upper face 20 of the main body that serves as a stop to prevent the first training aid 10 being screwed too far into the sole of a ski boot.

It is even possible to provide a kit with a plurality of first training aids 10 with bases 18 of different areas. A user may then start with a first training aid 10 having a relatively large base 18 and may learn over time to achieve good balance using this first training aid 10 when inserted into a ski boot, or at least to improve balancing skills. The user can then remove the first training aid 10 from the ski boot and can replace it with one having a base 18 of a smaller area and can again practice balancing using this until balancing skills improve.

The first training aid 10 with a base 18 of smaller area can then in turn be replaced with a first training aid having a base 18 of still smaller area and so on. As the area of the base 18 reduces, the user can become more and more competent in balancing upon a smaller and smaller area, corresponding to the sweet spot of a ski (if the ski boot were attached to a ski). Thus the user can become increasingly adept at focussing upon the sweet spot in a manner that is simply not possible using most standard ski training devices. Indeed the first training aid 10 allows the user in effect to develop a feel for the location of the sweet spot, without having to rely upon theoretical considerations of where the sweet spot might be. This can then be translated into improved skiing technique for people who already have some practice of skiing. In the case of a beginner a starting technique can be achieved that is already much more advanced than might otherwise be expected.

In any event the first training aid 10 allows a good balanced skiing position to be achieved that exerts pressure on the sweet spot of a ski without requiring extensive (and expensive) lessons on the piste to achieve this.

The first training aid 10 may be screwed into or out of a ski boot when required. This may be done by hand or, if desired by using tools (e.g. a spanner, screw driver or key may be used).

The training aid may optionally be shaped to assist in engagement with tools (e.g. for receiving the head of a screw driver, a key such as an Allen Key, for engaging with a spanner, etc.) Indeed in a simple embodiment a standard sports stud may be screwed into or out of the ski boot using a stud spanner already shaped for said stud.

Turning now to FIGS. 13 to 15 in further detail, a standard ski boot 100 is illustrated in these figures. The boot has indicators in the form of centre marks 102 (which can also be referred to as mid-sole marks), indicating a vertical plane passing through the centre of the sole of the boot across the width of the boot. This plane also passes through the sweet spot when the boot is used for skiing and preferably bisects it. These indicators 102 can be used as aids for positioning the boot when releasably attaching it to a ski via bindings.

An arrow 104 indicates the ideal position for pressure to be applied to the sweet spot of a ski (to which the boot 100 would be attached by bindings, when skiing), as shown in FIG. 13.

FIG. 14 also shows the centre marks 102. There is one centre mark 102 on either side of the boot. In this case, a small circle 106 is also visible on the sole at a mid-point between the markings. This indicates the ideal position for pressure to be applied to the sweet spot of the ski (corresponding to the base of the arrow 104 described above). It is also corresponds to the position in which the training aids 10 shown in FIGS. 1 to 12 would be screwed into the boot.

FIG. 15 show the boot 100 with a first training aid 10 attached thereto. The first training aid 10 has been attached to the boot 100 with the screw thread 14 passing through the centre of the circle 106 shown in FIG. 14 (which marks the mid point of the sole). It has been screwed into position until the upper surface 20 of the main body 12 of the first training aid 10 has acted as a stop by abutting the lower surface of the sole of the boot. Thus the first training aid 10 is secured in place until it is desired to remove it by unscrewing it.

A wearer of the boot 100 can lean forwards or backwards until a balanced position has been achieved. The wearer can also/alternatively lean from side to side whilst trying to balance upon the base 18 of the training aid. Indeed a range of positions can be attempted whilst trying to achieve balance to mimic positions that might be adopted during skiing. All of the time the wearer can be confident in the balanced position of applying pressure in a manner that would mimic applying pressure to the sweet spot of skis.

Example 2

A Second Ski Training Aid of the Present Invention

The second ski training aid 10 is illustrated in FIG. 2 and can be attached to a standard ski boot 100 as shown in FIG. 13 or 14 to provide a combination as illustrated in FIG. 15.

The second training aid 10 is very similar to the first training aid 10 shown in FIG. 1 and described in Example 1. However, here the main body 12 (which functions as a balancing member) of the second training aid 10 is hollow, rather than solid.

Thus the base 18 of the second training aid 10 is not in the form of a circular planar surface but is essentially annular/ring shaped. In practice, however, the second training aid 10 is used in the same manner as the first training aid 10 illustrated in FIG. 1. Indeed the base 18 is still symmetrical about a central point and balancing will feel much the same. Material can however be saved because of the hollow construction of the base 18.

It should of course be ensured that the base 18 is strong enough to support a person wearing a ski boot 11 when balancing upon the second training aid, given the hollow nature of the main body 12 when compared to the more solid nature of the base shown in FIG. 1. Thus, if necessary, stronger materials can be used than for making the body 12 of the first training aid. However if the material is sufficiently strong then this is of course not necessary.

The hollow main body 12 can also be useful for other purposes, apart from saving cost or saving material. For example, it may be used to house the head of a screw and allow access to a screw driver. If the shaft of the screw is used to screw into the sole of the ski boot 100 then this can provide a useful way of attaching the second training aid 10 to the ski boot 100. In alternative embodiments the second training aid 10 may be pushed into the sole of a ski boot 100 and turned without using a screw driver (e.g. by using a spanner or by hand).

Given that the first and second training aids 10 have the same shape, apart from the fact that the first training aid 10 has a solid body 12 and the second training aid has a hollow body 12, they appear the same from the side. Thus FIG. 15 illustrates either of these training aids 10 when attached to the underside of a ski boot 100.

Example 3

A Third Ski Training Aid of the Present Invention

The third ski training aid 10 is illustrated in FIG. 3 and can be attached to a standard ski boot 100 as shown in FIG. 13 or 14 to provide a combination as illustrated in FIG. 16.

The third training aid 10 has a cylindrical main body 12 (which functions as a balancing member), rather than the frustoconical main body 12 of the first training aid 10 shown in FIG. 1. Again the base 18 of the main body 12 has a planar surface. It will however be appreciated here that the surface of the base 18 has the same size of the surface of the top 20 of the main body, due to the cylindrical shape. This contrasts with the frustoconical main body 18 shown in FIG. 1, where the base 18 has a much smaller surface area than the top 20.

The third training aid 10 shown in FIG. 3 can therefore allow easier balancing than the first training aid 10 illustrated in FIG. 1 (and also than the second training aid shown in FIG. 2), assuming that said training aids have main bodies with an upper surface of the same size and shape. This is because of the downwardly tapering nature of the main body 12 of the training aid shown in FIG. 1 compared to the non-tapering nature of the main body 12 of the cylindrical training aid shown in FIG. 3.

Thus a third training aid 10 could be used at an earlier stage in training than a first (or second) training aid 10. In a further alternative it would of course be possible to provide a series of third training aids 10 with cylindrical main bodies 12 of smaller and smaller diameter, so that the surface areas of the bases 18 also becomes smaller and smaller. Again this would allow a training program to be set up whereby the degree of difficulty in balancing could increase as a person undergoing training focuses more and more upon the smaller area. (In effect a target sweet spot could be considered to be getting smaller and smaller).

Turning now to FIG. 16 in greater detail, the third training aid 10 is shown attached to the underside of a ski boot 100 in much the same manner as described in Example 1 for the first training aid 10 with reference to FIG. 15. However it can be seen in FIG. 16 that the main body 12 of the third training aid 10 does not taper from top to bottom As discussed earlier, this can make balancing easier than when using a corresponding training aid 10 that tapers downwardly. It can also be useful in reducing pressure applied by the training aid 10 (compared to a tapered version). This can reduce the risk of damaging a floor.

Example 4

A Fourth Ski Training Aid of the Present Invention

The fourth training aid 10 is illustrated in FIG. 4. It is very similar to the third training aid 10 shown in FIG. 3 and described in Example 3. However, the main body 12 (which functions as a balancing member) of the fourth training aid 10 is hollow. Possible advantages of a hollow body are discussed in Example 2 and apply here mutatis mutandis.

Given that the third and fourth training aids 10 have the same shape, apart from the fact that the third training aid 10 has a solid body 12 and the fourth training aid has a hollow body 12, they appear the same viewed from the side. Thus FIG. 16 illustrates either training aid 10 when attached to the underside of a ski boot 100.

Example 5

A Fifth Ski Training Aid of the Present Invention

A fifth ski training aid 10 is illustrated in FIG. 5 and can be attached to a standard ski boot 100 as shown in FIG. 13 or 14 to provide a combination as illustrated in FIG. 17. The fifth training aid 10 shown here is similar to the first training aid 10 shown in FIG. 1, apart from the fact that the frustoconical main body 12 (which functions as a balancing member) tapers in an upwards direction rather than in a downwards direction.

The effect of this is that the lower surface 18 of the main body 12 is larger than the upper surface 20. Thus for fifth and first training aids 10 having frustoconical main bodies of the same mass, but tapering in opposite directions, the fifth training aid 10 would be much easier to balance on than the first training aid. It also allows much less pressure to be applied to a floor.

It would therefore be possible to provide a kit comprising first, third and fifth training aids 10 (or even second, fourth and sixth training aids 10), each having a main body 12 of the same mass but each having a different lower surface area 18.

A user could begin training by using the fifth training aid attached 10 to a ski boot 100; then replace it with a third training aid 10; and then replace that with a first training aid 10, with the degree of difficulty increasing as the surface area 18 at the base of the training aid 10 reduces. Again this allows increased focussing upon a sweet spot (or allows focussing upon a sweet spot of smaller and smaller size).

In a further alternative it would of course be possible to provide a series of fifth training aids 10 with main bodies 12 having gradually reduced tapering from base to top so that the surface areas of the bases become smaller and smaller. Again this would allow a training program to be set up whereby the degree of difficulty in balancing would increase as a person undergoing training focuses more and more upon a smaller area. (In effect a target sweet spot could be considered to be getting smaller and smaller).

Turning now to FIG. 17 in greater detail, the fifth training aid 10 is shown attached to the underside of a ski boot 100 in much the same manner as described in Example 1 for the first training aid 10 with reference to FIG. 15. However it can be seen in FIG. 17 that the main body 12 of the fifth training aid 10 does not taper from top to bottom but in the reverse direction (i.e. from bottom to top.)

As discussed earlier, this can make balancing easier than when using a corresponding training aid 10 with a main body 12 that tapers from top to bottom. It can also be useful in reducing pressure applied by the training aid 10 (again compared to a training aid 10 with a main body 12 that tapers from top to bottom). This can be important if the training aid 10 is used indoors and that might otherwise damage a floor.

Example 6

A Sixth Ski Training Aid of the Present Invention

A sixth training aid 10 of the present invention is illustrated in FIG. 6. It is very similar to the fifth training aid 10 shown in FIG. 5 and described in Example 5. However, the main body 12 (which functions as a balancing member) of the sixth training aid 10 is hollow. Possible advantages of a hollow body are discussed earlier in Example 2 and apply here mutatis mutandis.

Given that the fifth and sixth training aids 10 have the same shape, apart from the fact that the fifth training aid 10 has a solid body 12 and the sixth training aid has a hollow body 12, they appear the same viewed from the side. Thus FIG. 17 illustrates either of these training aids 10 when attached to the underside of a ski boot 100.

Example 7

A Seventh Ski Training Aid of the Present Invention

A seventh training aid 10 of the present invention is illustrated in FIG. 7. It can be attached to a standard ski boot 100 as shown in FIG. 13 or 14 to provide a combination as illustrated in FIG. 18.

It has a main body 12 (which functions as a balancing member) that is in the form of a segment taken through a solid sphere, with a relatively large portion of the top of the sphere cut off and a relatively small portion of the bottom of the sphere cut off. The upper 20 and lower 18 faces of the main body 12 are planar and have circular edges, with the lower face 18 having a smaller surface area than the upper face 20. Thus in some respects this training aid 10 can be considered similar to the training aid 10 shown in FIG. 1. However the main body 12 of the seventh training aid 10 has rounded sides compared to the straight sloping sides of the frustoconical main body 12 of the training aid 10 shown in FIG. 1.

This can be useful in making it easier for a user wearing boots with the training aid 10 attached to be able to pivot/rock/rotate so as to practice different skiing techniques whilst still seeking to apply maximum pressure to a spot corresponding to the sweet spot.

As with the other training aids 10 of the invention, it is possible for a user to start with a seventh training aid 10 having a relatively large base 18 and to learn over time to achieve good balance using this training aid 10 when inserted into a ski boot, or at least to improve balancing skills. The user can then remove the seventh training aid 10 from the ski boot and can replace it with another seventh training aid having a base 18 of a smaller area and can again practice balancing using this until balancing skills improve.

The seventh training aid 10 with a base 18 of smaller area can then in turn be replaced with a seventh training aid having a base 18 of still smaller area and so on. As the area of the base 18 reduces, the user can become more and more competent in balancing upon a smaller and smaller area, corresponding to the sweet spot of a ski (if the ski boot were attached to a ski).

An alternative is for the user to start with a seventh training 10 as described here and to progress through ninth and eleventh training aids 10 as discussed in the following examples. Thus the degree of difficulty in balancing can increase, corresponding to increased focussing in balancing upon a region corresponding to the sweet spot. [This is in some respects analogous to starting with the first training aid 10 and progressing through the third and fifth training aids 10, as described earlier.]

Turning now to FIG. 18 in greater detail, the seventh training aid 10 is shown attached to the underside of a ski boot 100 in much the same manner as described in Example 1 for the first training aid 10 with reference to FIG. 15. However it can be seen in FIG. 18 that the main body 12 of the seventh training aid 10 does not taper regularly from top to bottom but curves from top to bottom, thus providing a convenient surface for practicing a variety of maneuvers.

Example 8

An Eighth Ski Training Aid of the Present Invention

An eighth training aid 10 of the present invention is illustrated in FIG. 8. It is very similar to the seventh training aid 10 shown in FIG. 7 and described in Example 7. However, the main body 12 (which functions as a balancing member) of the eighth training aid 10 is hollow.

Advantages of a hollow body are discussed in Example 2 and apply here mutatis mutandis.

Given that the seventh and eighth training aids 10 have the same shape, apart from the fact that the seventh training aid 10 has a solid body 12 and the eighth training aid has a hollow body 12, they appear the same viewed from the side. Thus FIG. 18 illustrates either training aid 10 when attached to the underside of a ski boot 100.

Example 9

A Ninth Ski Training Aid of the Present Invention

A ninth training aid 10 of the present invention is illustrated in FIG. 9. It can be attached to a standard ski boot 100 as shown in FIG. 13 or 14 to provide a combination as illustrated in FIG. 19.

It has a main body 12 (which functions as a balancing member) that is in the form of a segment of a solid sphere, with an equal portion of the top and bottom of the sphere cut off. The upper 20 and lower 18 faces of the main body 12 are planar and have circular edges, with the lower face 18 having the same surface area as the upper face 20. Thus in some respects this training aid 10 can be considered similar to the training aid 10 shown in FIG. 3. However the main body 12 of the ninth training aid 10 has rounded sides compared to the fixed cross section of the cylindrical main body 12 of the training aid 10 shown in FIG. 3.

This can be useful in making it easier for a user wearing boots with the training aid 10 attached to be able to pivot/rock/rotate when practicing different skiing techniques, whilst still seeking to apply maximum pressure to a spot corresponding to the sweet spot.

As with the other training aids 10 of the invention, it is possible for a user to start with a ninth training aid 10 having a relatively large base 18 and to learn over time to achieve good balance using this training aid 10 when inserted into a ski boot, or at least to improve balancing skills.

The user can then remove the ninth training aid 10 from the ski boot and can replace it with another ninth training aid having a base 18 of a smaller area and can again practice balancing using this until balancing skills improve.

The ninth training aid 10 with a base 18 of smaller area can then in turn be replaced with a ninth training aid having a base 18 of still smaller area and so on. As the area of the base 18 reduces, the user can become more and more competent in balancing upon a smaller and smaller area, corresponding to the sweet spot of a ski (if the ski boot were attached to a ski).

An alternative is for the user to start with a seventh training 10 as described earlier and to progress through a ninth training aid as discussed here and then to an eleventh training aid 10 as discussed later. Thus the degree of difficulty in balancing can increase, corresponding to increase focussing on balancing upon a region corresponding to the sweet spot. [This is in some respects analogous to starting with the first training aid 10 and progressing through the third and fifth training aids 10, as described earlier.]

Turning now to FIG. 19 in greater detail, the ninth training aid 10 is shown attached to the underside of a ski boot 100 in much the same manner as described in Example 3 for the third training aid 10 with reference to FIG. 16. However it can be seen in FIG. 19 that the main body 12 of the ninth training aid 10 does not have the same cross section from top to bottom but curves from top to bottom, thus providing a convenient bearing surface for practicing a variety of maneuvers.

Example 10

A Tenth Ski Training Aid of the Present Invention

A tenth training aid 10 of the present invention is illustrated in FIG. 10.

It is very similar to the ninth training aid 10 shown in FIG. 9 and described in Example 9. However, the main body 12 (which functions as a balancing member) of the tenth training aid 10 is hollow. Possible advantages of a hollow body are discussed earlier in Example 2 and apply here mutatis mutandis.

Given that the ninth and tenth training aids 10 have the same shape, apart from the fact that the ninth training aid 10 has a solid body 12 and the tenth training aid has a hollow body 12, they appear the same viewed from the side.

Thus FIG. 19 illustrates either of these training aids 10 when attached to the underside of a ski boot 100.

Example 11

An Eleventh Ski Training Aid of the Present Invention

An eleventh training aid 10 of the present invention is illustrated in FIG. 11. It can be attached to a standard ski boot 100 as shown in FIG. 13 or 14 to provide a combination as illustrated in FIG. 20.

It has a main body 12 (which functions as a balancing member) that is in the form of a segment of a sphere, with a relatively large portion of the bottom of the sphere cut off and a relatively small portion of the top of the sphere cut off. The upper 20 and lower 18 faces of the main body 12 are planar and have circular edges, with the lower face 18 having a larger surface area than the upper face 20. Thus in some respects this training aid 10 can be considered similar to the training aid 10 shown in FIG. 5.

However the main body 12 of the eleventh training aid 10 has rounded sides compared to the straight sloping sides of the frustoconical main body 12 of the training aid 10 shown in FIG. 5.

This can be useful in making it easier for a user wearing boots with the training aid 10 attached to be able to pivot/rock/rotate so as to practice different skiing techniques whilst still seeking to apply maximum pressure to a spot corresponding to the sweet spot.

As with the other training aids 10 of the invention, it is possible for a user to start with a seventh training aid 10 having a relatively large base 18 and to learn over time to achieve good balance using this training aid 10 when inserted into a ski boot, or at least to improve balancing skills.

The user can then remove the eleventh training aid 10 from the ski boot and can replace it with another eleventh training aid having a base 18 of a smaller area and can again practice balancing using this until balancing skills improve.

The eleventh training aid 10 with a base 18 of smaller area can then in turn be replaced with a eleventh training aid having a base 18 of still smaller area and so on. As the area of the base 18 reduces, the user can become more and more competent in balancing upon a smaller and smaller area, corresponding to the sweet spot of a ski (if the ski boot were attached to a ski).

An alternative is for the user to start with a seventh training 10 and to progress through ninth and eleventh training aids 10. Thus the degree of difficulty in balancing can increase, corresponding to increase focussing on balancing upon a region corresponding to the sweet spot. [This is in some respects analogous to starting with the first training aid 10 and progressing through the third and fifth training aids 10, as described earlier.]

Turning now to FIG. 20 in greater detail, the eleventh training aid 10 is shown attached to the underside of a ski boot 100 in much the same manner as described in Example 5 for the first training aid 10 with reference to FIG. 17. However it can be seen in FIG. 20 that the main body 12 of the eleventh training aid 10 does not taper regularly from bottom to top, but curves, thus providing a convenient surface for practicing a variety of maneuvers.

Example 12

A Twelfth Ski Training Aid of the Present Invention

A twelfth training aid 10 of the present invention is illustrated in FIG. 12.

It is very similar to the eleventh training aid 10 shown in FIG. 11 and described in Example 11. However, the main body 12 (which functions as a balancing member) of the twelfth training aid 10 is hollow. Possible advantages of a hollow body are discussed earlier in Example 2 and apply here mutatis mutandis.

Given that the eleventh and twelfth training aids 10 have the same shape, apart from the fact that the eleventh training aid 10 has a solid body 12 and the twelfth training aid has a hollow body 12, they appear the same viewed from the side. Thus FIG. 20 illustrates either of these training aids 10 when attached to the underside of a ski boot 100.

Example 13

A Thirteenth Training Aid of the Present Invention

This is an alternative training aid 110 to those 10 discussed in the earlier examples. In the earlier examples training aids 10 comprising balancing members in the form of blocks of various sizes or shapes are located directly beneath the sole of a ski boot. This is achieved by using a screw to insert in to the sole of a ski boot. Thus the sole is penetrated.

Although in practice this may cause little damage (especially if an insert for receiving the screw thread is provided in the ski boot) some skiers may be reluctant to modify the ski boot in such a manner.

Various views of the alternative training aid 110 are shown in FIGS. 21 to 26. Here a training aid 110 for fitting to a right ski boot is shown. (A corresponding training aid for fitting to the left boot is not shown, but would essentially be a mirror image thereof.) FIG. 38 shows the training aid 110 attached to a ski boot 100 when viewed from one side.

The training aid 110 has a base 112 that includes a generally planar base plate 113 for contacting the sole of a ski boot and a strengthening member 115 (see e.g. FIG. 23). The strengthening member 115 is relatively thick compared to the base plate 113. The base plate 113 includes a plurality of grooves 117 that can aid in providing a degree of flexibility as well as increased grip. It has a label 119 attached to it, which is illustrated by an ellipse in the figures.

The label 119 can be attached to the base plate 113 by any desirable means (e.g. adhesive, by a press-fit mechanism etc) and can be used for advertising, technical information, identification of a manufacturer or trade mark holder, or any other desired purpose. It may, for example, include a logo. The label 119 also functions as a cover, as discussed later with reference to FIG. 31. Indeed, in some cases, it may be unmarked and function merely as a cover.

The base 112 is connected to relatively thin, flexible sides 114, 116 and is thereby interconnected to front and heel straps 118, 120, which serve to hold the plate base 113 against the sole of the ski boot in a secure manner until the straps 118, 120 are released.

The base plate 113, strengthening member 115 and sides 114, 116 can all be formed of a single piece of moulded plastics material, as discussed later. This is preferably formed of a strong and resilient plastics material. A polyamide material (e.g. a polyamide known as "PA6" or "Nylon 6") is preferred.

Underneath the base 112 a balancing member 122 is present. Again it is preferably formed of a strong and resilient plastics material. A polyamide material (e.g. a polyamide known as "PA6" or "Nylon 6") is again preferred.

The balancing member 122 is marked with an indicator 124 indicating the degree of difficulty it provides in achieving a balanced position (a position in which only the balancing member 122 contacts the ground). For example, in the embodiment illustrated in FIGS. 21 to 27 a circle is provided to indicate a degree of difficulty suitable for a beginner.

The underside 126 of the balancing member 122 can be seen to have a fairly large surface area (see e.g. FIG. 23) and also to be curved in a convex manner (see e.g. FIG. 26).

In the embodiment shown in the figures the balancing member has a central aperture 132 that receives a screw 131 (see e.g. FIG. 23 and also FIGS. 31 to 37, as discussed later in further detail). The screw 131 has a head shaped so that it can be turned using an Allen key. The screw 131 functions to attach the balancing member 122 to the base 112 and also to remove it from the base 112 when desired. Thus the screw 131 provides releasable attachment means for the balancing member 122.

[In an alternative embodiment, which is not shown here, the balancing member 122 is not releasable but is integrated into the base 112. It may, for example, be part of a single moulded component. In this case the balancing member 122 would not of course require a screw 131 or other means of attachment to the base 112, given that is already part of the same structure.] In contrast, the releasable attachment means allowing the base 112 to be releasably attached to a ski boot is provided by straps 118,120 that can be tightened or loosened using adjustable grips 142, referred to herein as "adjusters". Thus the straps 118, 120 can be tightened so that they can be fitted around a ski boot when the training aid 110 is to be used, or can be loosened or released from the adjusters so that the training aid 110 can be removed from the ski boot after use.

Pivoting about the balancing member 122 can be used to mimic skiing and also to achieve a balanced position. The rounded underside 126 of the balancing member 122 facilitates pivoting and can also help in reducing the risk of damage to a floor e.g. to a polished wooden floor.

It is also possible to provide a floor protector (e.g. a mat) to further reduce the risk of damage. This may advantageously be formed of slip-resistant material, or may have a slip-resistant surface.

Turning now to FIGS. 27 to 30, as discussed earlier these show the training aid 110 shown in FIGS. 21 to 26, but with a range of different balancing members 122 fitted to the base.

Figure 27:
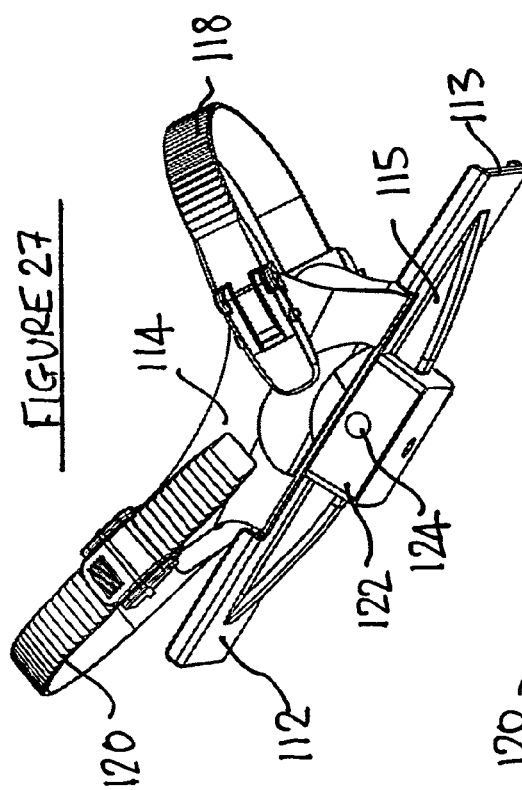

FIG. 27 shows a training aid 110 comprising the largest balancing member 122 of those shown (corresponding to the balancing member 122 shown in earlier FIGS. 21 to 26). The balancing member 122 is shown marked with a circle 124 to indicate beginner/novice level.

Any other indicator 124 could if course be used, provided that a set of indicators for a set of balancing members 122 that provide differing degrees of difficulty in balancing allows the balancing members 122 to be distinguished from one another. (It is also possible to use unmarked balancing members 122, given that different sizes can be distinguished visually.)

In use, the training aid 110 incorporating the balancing member 122 would of course be strapped onto a right ski boot and be used in conjunction with a corresponding training aid 110 incorporating a corresponding balancing member 122 strapped onto the left ski boot.

The largest balancing member 122, as shown in FIG. 27, provides the lowest degree of difficulty of balancing. It can thus be regarded as a basic training aid 110. It is nevertheless still very useful in helping a user to shift his/her weight distribution so as to focus pressure on a spot that would correspond to the sweet spot if the user were wearing a ski—sometimes referred to herein as the "notional sweet spot". [This spot lies along a central vertical axis passing through the balancing member 122. This vertical axis corresponds to the axis along which the shaft of screw 131 attaching the balancing member 122 to the base 112 lies.]

The largest balancing member 122 is also useful for nervous users, or for users who may be relatively unsteady or injury prone. It provides a way of getting a user accustomed to balancing, without making it unduly difficult.

The user can thereby improve his/her skills until he/she is ready to move on to the next level of difficulty, which allows the user to be able to focus on the notional sweet spot with a higher level of specificity.

Figure 28:
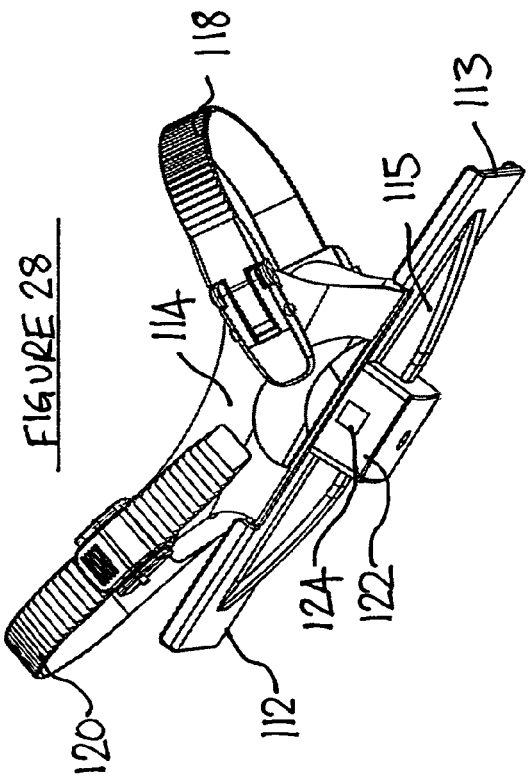

When the user is ready to move on to the next level of difficulty, the user can sit down, unstrap the training aid 110, remove the "old" balancing member 122 shown in FIG. 27 with an Allen key and then screw in a "new" balancing member 122 as shown in FIG. 28 with the same Allen key. Alternatively, another person (e.g. a friend, relative or instructor) may perform this operation.

The new balancing member 122 shown in FIG. 28 is marked with a square 124 to indicate an intermediate level of difficulty in balancing and to distinguish from the circle 124 used for the balancing member 122 shown in FIG. 27.

A similar procedure would of course be adopted for the other ski boot, so that both ski boots would then have training aids 110 incorporating balancing members 122 of intermediate level of difficulty attached thereto.

Figure 29:
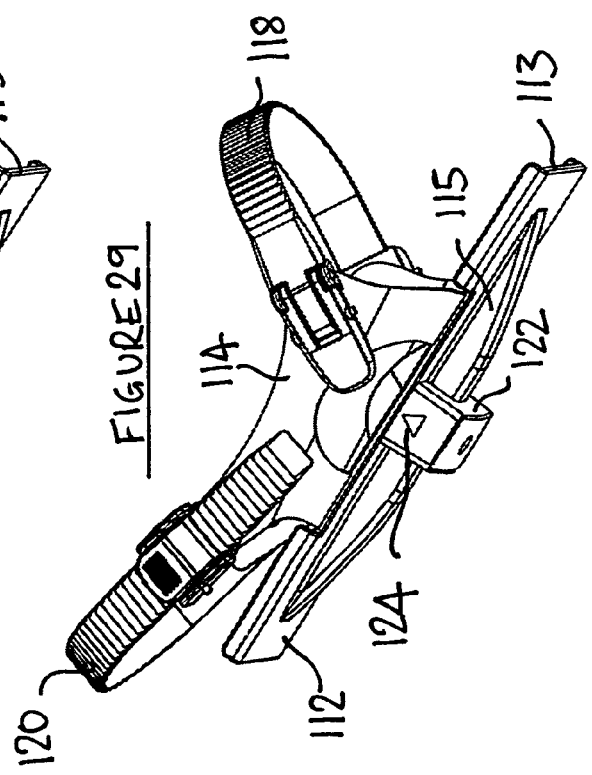

As for the training aid 110 shown in FIG. 27, a user can practice balancing using the training aid 110 shown in FIG. 28 until the user is competent at balancing and can then move on to the next stage, in which the balancing member 122 is replaced with a new balancing member 122, as illustrated in FIG. 29.

The balancing member 122 shown in FIG. 29 is marked with a triangle 124 to indicate an a high/advanced level of difficulty in balancing and to distinguish from the balancing members 122 shown in FIGS. 28 and 27, which are marked with a square 124 and a circle 124 respectively.

The procedure is repeated until the user becomes competent at balancing upon ski boots fitted with training aids 110 comprising the balancing member 122 shown in FIG. 29.

Figure 30:
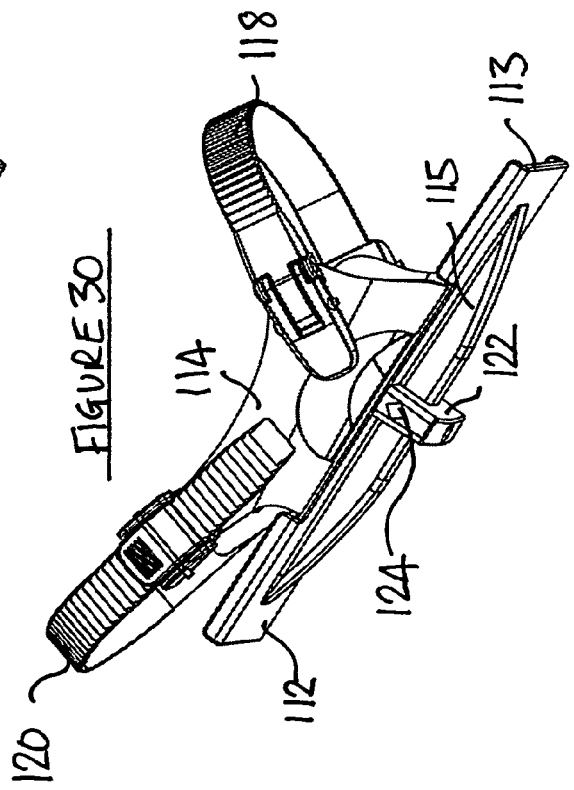
Figure 31:
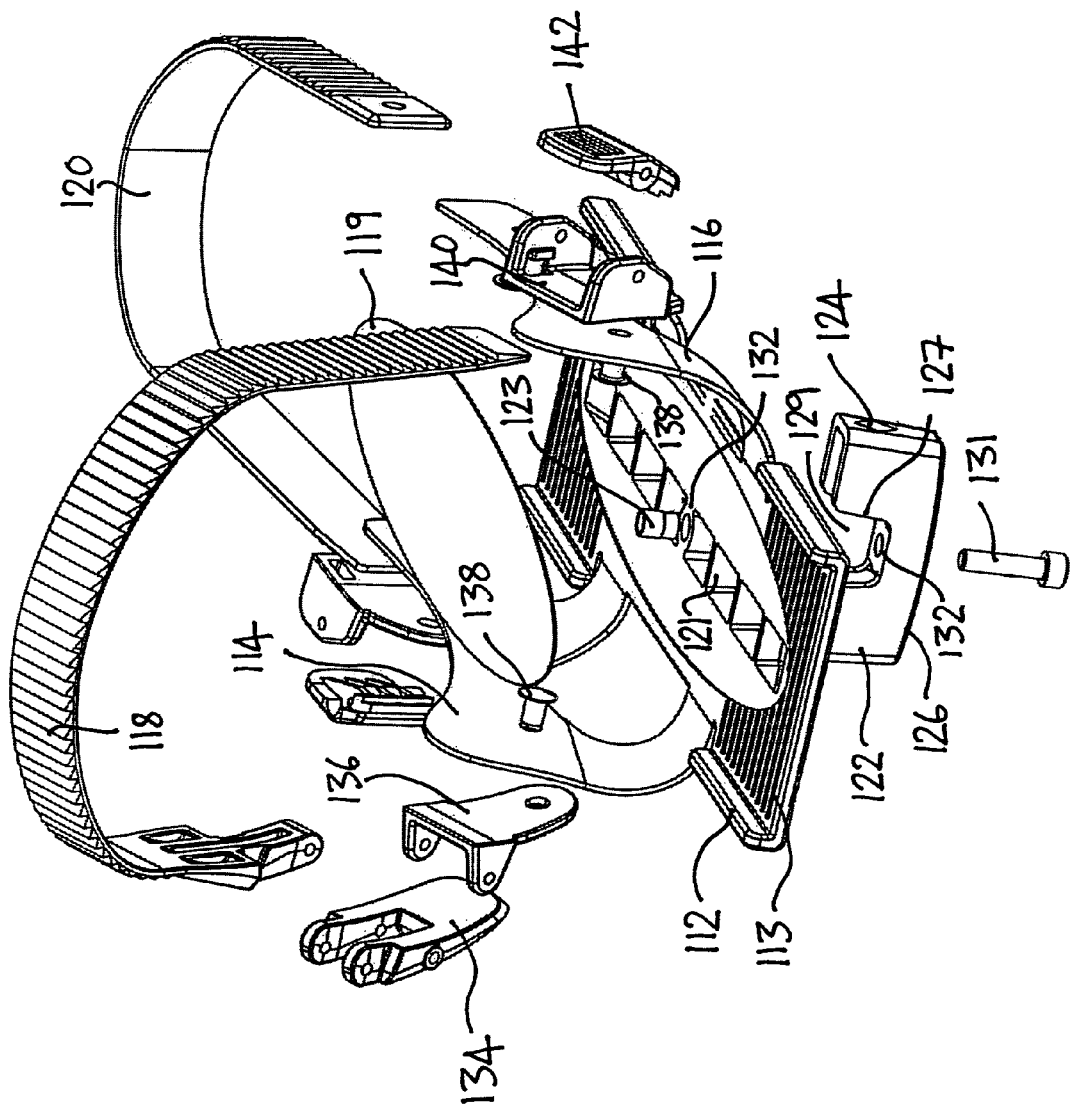

This balancing member can be removed and replaced with a balancing member 122 shown in FIG. 30, which is marked with a diamond 124 to indicate an expert level of difficulty in balancing an to distinguish from the triangle, square and circle 124 shown in FIGS. 29, 28 and 27 respectively.

Once the user becomes competent at balancing using ski boots fitted with training aids 110 comprising the balancing member 122 shown in FIG. 30, the user will have an extremely high level of skill in balancing on spots corresponding to the sweet spots of a pair of skis. Indeed as a user progresses through the stages from novice/beginner level to expert level the user should become more and more precise in shifting weight distribution to focus in the sweet spots.

The foregoing procedure described with reference to FIGS. 27 to 30 is of course simply illustrative. It can be varied in many ways. For example, fewer or more stages of training may be provided by using fewer or more balancing members 122. Indeed some users may be happy to stop after only one, two or three training stages using different balancing members 122. It is not essential, or likely, that all users will reach expert level or even advanced level.

It is of course possible for a user having trained using a training aid 110 of the present invention to go skiing at any stage after training and thereby to assess/put into practice any improvement attained. This can be done after each stage of training using a training aid 110 of the present invention, after a series of stages, or even part way through a stage.

It is envisaged that a user is likely to see significant improvements when skiing after using a user a training aid 110 of the present invention even for a relatively short period. This can be a useful incentive for the user to continue training. It also reinforces the attention of the user in focussing pressure on the sweet spot.

The training aid 110 can provide a productive use of time if, for example, a ski slope is closed, or if a user is away from the slope (e.g. at a hotel/at home preparing for a skiing holiday).

The training aid 110 can also be particularly useful to a ski instructor in persuading students to think about the sweet spot and focus pressure upon it.

Turning now to particular components of the training aid 110, FIG. 31 is an exploded view of the training aid illustrated in FIG. 30 when shown from the front and to one side. It illustrates selected components used in the manufacture of the training aid 110.

It shows a base 112 that comprises a generally planar base plate 113 and a strengthening member 115. Here a label/cover 119 is shown removed from the base plate 113 to expose inner ribs 121 that provide rigidity and strength to the strengthening member 115.

It can also be seen that the base plate 113 incorporates a threaded insert 123 (shown here temporarily removed from the base plate 113 for ease of reference). The threaded insert 123 is used for receiving the exterior thread of a screw 131 that is itself used to attach the balancing member 122 to the base 112. The balancing member 122 can be seen to have walls 127 that define a central channel 129 into which the strengthening member 115 snugly fits.

This figure is also useful in showing that flexible sides 114, 116 that extend from the base plate 113 are part of the same moulded unit as the base plate 113.

Indeed, as shown in FIGS. 32 and 33, the base plate 113, sides 114, 116 and strengthening member 115 are all formed of a single piece of moulded plastics material 150. The sides 114, 116 are relatively thin and flexible, whilst being resilient and tear resistant. This allows them to be turned upwards and, when in use with straps attached and fastened around a ski boot, to flex so that they fit closely to the sides of the ski boot.

As shown in FIG. 31, the straps 118, 120 are secured in place by the action of levers 134 acting on lever mounts 136. Thus, when a lever 134 is pressed down the strap 118 is secured in position. The lever 134 can be pulled up to release the strap 118 (e.g. if it is worn and need replacement). The lever mounts 136 are riveted in position by rivets 138 that pass through apertures in the sides 114 of the base 112.

When the straps 118, 120 are in use, they pass around the heel area or forefoot area of a ski boot and are releasably held in place by an adjuster 142 that is received in an adjuster mount 140. The adjuster mount 140 is again secured in position by a rivet 138 through an aperture in the side wall. The adjusters 142 are spring loaded (spring not shown) to facilitate easy adjustment in tightening or loosening of a strap 118.

Turning now to FIGS. 34 to 37, these show the balancing members 122 illustrated in FIGS. 27 to 30 respectively, when removed from the base 112 and viewed from above and to one side.

Figure 34:
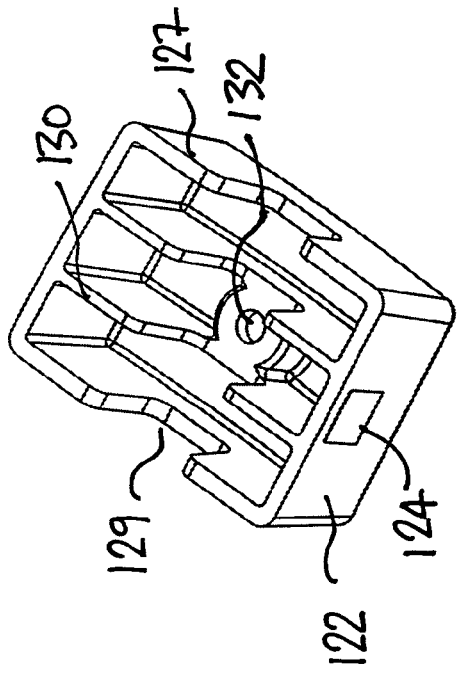
Figure 35:
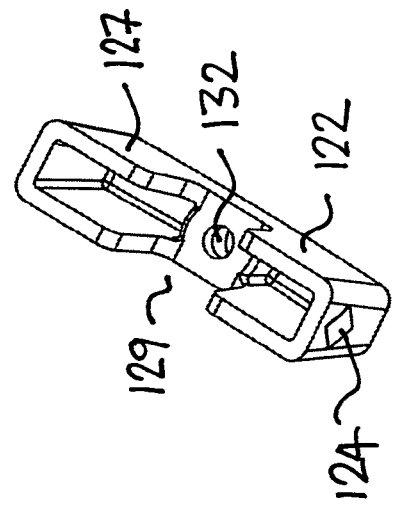
Figure 36:
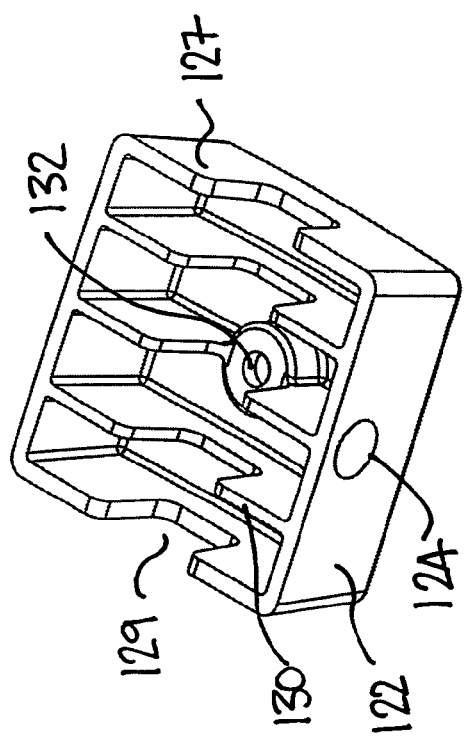
Figure 37:
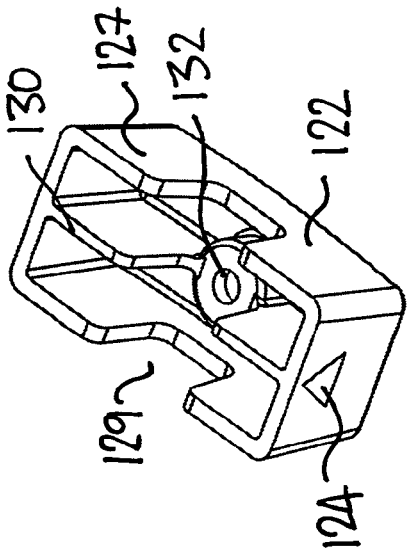

It can be seen that the balancing members 122 illustrated in FIGS. 34 to 36 are generally hollow, but, in addition to external walls 127, they comprise a plurality of internal reinforcing ribs 130. These serve to strengthen the balancing members 122. In contrast to the balancing members 122 shown in FIGS. 33 to 36, the balancing member 122 shown in FIG. 37 does not have any internal ribs 130, but has thicker side walls 127 to compensate for this. All of the balancing members 122 shown in FIGS. 34 to 37 are shaped to fit over the strengthening member 115 that is shown in FIG. 33. Thus ribs 130 and walls 127 are indented so as to define a channel 129 for receiving the strengthening member 115.

Many alternatives are of course possible. For example the balancing members 122 may be solid rather than hollow. Alternatively they may hollow, but formed of strong material to avoid the need for ribs 130 or other internal reinforcements. There are many possibilities here, as is well known to the skilled person.

FIG. 38 shows one balancing member 122 in position when attached to the base 112 of a training aid 110, which is itself releasably attached to a ski boot via straps 118, 120

Example 14

Fourteenth Training Aid of the Present Invention

Unlike the other examples, this example (not illustrated) covers the situation where a training aid may be permanently attached to a ski boot (or other piece of footwear) or may even be an integral part thereof. Thus for example the training aid may be moulded in place or secured by a permanent adhesive, by rivets, etc. Here the boot is not intended to be used for skiing, but purely for training.

An example is where a skier may have an old and new pair of ski boots and may be thinking of throwing away the old pair, or may never intend to use them for skiing. The old pair can be converted by permanently attaching a training aid of the present invention to each of the boots.

A further example is where boots are made that mimic ski boots but may be far less expensive (e.g. less durable/with fewer features, etc) and may be designed simply for training in accordance with the present invention—i.e. to allow pivoting and balancing as described earlier.

Here the boots may, for example, each have a sole that is generally flat but includes an integral/fixed part positioned underneath the arch of a normal wearer of the boot that protrudes downwardly towards the ground. The wearer of the boots can try to balance upon this part of the boots so as to mimic a desired balanced position for skiing.

Such training boots may be useful for ski schools in teaching beginners the correct balancing position. They can be particularly useful for people who may initially be very nervous of skis, or who otherwise might take a long time to learn how to balance on skis. It is even possible to utilise footwear other than boots for training, although boots are preferred (especially boots of the same general size, shape and/or rigidity as ski boots).

Glossary

Certain terms used herein will now described in further detail below.
"Sweet Spot"

The term "sweet spot" is well known to those skilled in the art of skiing. It is normally used to refer to that part of the ski upon which it is generally desirable for a skier to apply the most pressure (relative to other parts of the ski of equivalent size).

Modern skis are generally curved with relatively wide parts of the skis being located towards the front and the rear parts of the skis and the narrowest part of the main body of the ski located in-between. The sweet spot will normally correspond to the mid point of a ski's running surface, typically at said narrowest part of the main body of the ski.

It is discussed in many ski instruction manuals, including online publications. Reference can be made for example to an online publication entitled "Ski Performance Breakthrough" by Hugh Monnet that is available on the British Alpine Ski School (BASS) website, where the sweet spot is discussed in Chapter 2.

It should also be noted that many modern ski boots already include one or more central indicators, often known as midsole indicators, positioned for alignment with a vertical plane passing through said sweet spot of a ski.

Typically such an indicator is located on one or both sides of the ski boot and can be seen while the ski boot is attached to a ski. It is also/alternatively possible to provide an indicator on the underside of the sole of the ski boot. This may indicate the area of the sweet spot or the centre thereof.

Ski bindings will typically be securely positioned on skis in a manner such that a vertical plane passing through the sweet spot along the so passes through the mid-sole mark of the boot will be positioned directly above the mid point of the ski's running surface.

The sweet spot can therefore normally be considered to be located at a part of the ski located underneath the arch/mid point of the foot of a skier wearing a ski-boot that is correctly attached to the ski, assuming of course that the ski boot is of the correct size for the wearer and that the shape of the foot is generally normal.

It should of course be appreciated that each ski will have a sweet spot and that a skier may shift pressure exerted on each ski for different manoeuvres, slopes etc. Thus it may be desirable to apply less pressure to the sweet spot of one ski and more to the sweet spot of the other ski, depending upon a particular manoeuvre and/or ski slope.

It is nevertheless desirable in most circumstances that most of the pressure that is applied to each ski be focussed upon the sweet spot, and not under the heel of the foot (a common error with beginners), or under the ball of the foot (a very common error with intermediate skiers).

There are of course a few exceptions (e.g. when a skier is airborne in a ski jump, or where a skier may deliberately raise one ski e.g. to aid in avoiding an obstacle). However these are very minor and even here it will generally still be desirable to resume a posture in which pressure is focussed upon a ski's sweet spot as soon as an exceptional manoeuvre has been performed.

It should also be noted that, given that skis may be angled differently for different manoeuvres, slopes, etc., the sweet spot may be considered to extend across the width of a ski and not necessarily to be limited to a single central point. Indeed, the term "sweet spot" may often be considered to represent a small localised area where it is generally desired to focus the pressure applied to a given ski so as to aid in manoeuvring. It is therefore not essential to consider it as a single point. The area is preferably less than 100 cm$^2$ or less than 75 cm$^2$. More preferably it is less than 50 cm$^2$ or less than 25 cm$^2$. It may be less than 20 cm$^2$ less than 10 cm$^{2'}$ less than 5 cm$^2$ or even less than 2 cm$^2$. Thus it can be a very small area.

Some skiers consider the sweet spot to be a small circular area. The circle may for example have an a radius of less 5 cm, less than 4 cm, less than 3 cm, less than 2 cm or less than 1 cm. Alternatively it can be considered to be the centre points of such an area.

In any event, as indicated earlier the sweet spot will normally be considered to lie underneath the arch of the foot of a skier, assuming that the ski boot is of the correct size and is fitted properly to a ski.

"Ski boot"

This term is used to cover any footwear used for skiing. It can therefore include boots, shoes etc. Preferred footwear is adapted for attachment to ski bindings.

"Kit"

This means a plurality of items that are provided (e.g. sold) together. Preferably the items are provided in a single package, which may be sealed or unsealed.

The kit may optionally include instructions for use or assembly.

The invention claimed is:

1. A ski training device for training a user to focus pressure on a sweet spot of a ski, said training device comprising:
    a ski boot supporting base configured to support a sole of a ski boot;
    straps for releasably attaching said ski boot to a top surface of said ski boot supporting base;
    a strengthening member extending from said base away from said top surface and having a longitudinal dimension aligned longitudinally with a substantially central longitudinal axis of said ski boot supporting base;
    said strengthening member comprising a pair of angled end sections tapering toward a front end of said ski boot supporting base and toward a rear end of said ski boot supporting base, and a planar section between said angled end sections;
    a balancing member removably attachable to said ski boot supporting base such that said balancing member is positioned underneath said ski boot to correspond with a center mark of said boot located on said boot to correspond with a notional sweet spot of said ski when said boot is connected to said ski, said balancing member allowing said user wearing said ski boot to pivot about said balancing member until a desired balancing position is reached whereby pressure is focused at said notional sweet spot; and
    said balancing member comprising a channel defined therein configured to receive said planar section of said strengthening member, said balancing member extending further away from said ski boot supporting base than said strengthening member.

2. The ski training device according to claim 1, wherein said balancing member further comprises a rounded bottom to allow said user wearing said ski boot to pivot about said balancing member until the desired balancing position is reached, said rounded bottom curved such that outside ends of said bottom in a direction perpendicular to a longitudinal dimension of said ski boot supporting base are closer to said ski boot supporting base than a central portion of said bottom between said outside ends.

3. The ski training device according to claim 1 wherein said straps further comprises a pair of flexible sides connected to opposite sides of said ski boot supporting base, and front and heel straps each having at least one end releasably secured to one of said flexible sides, said front and heel straps being configured to hold said ski boot supporting base against said sole of said ski boot in a secure manner until said front and heels straps are released.

4. The ski training device according to claim 3, wherein said balancing member further comprises a plurality of inner ribs configured to provide rigidity and strength to said support.

5. The ski training device according to claim 1, wherein said balancing member allows pivoting of said ski boot in at least one of a forwards direction, and rearwards direction.

6. The ski training device according to claim 1, wherein said balancing member allows pivoting of said ski boot from side to side.

7. The ski training device according to claim 1, wherein said balancing member comprises a longitudinal dimension aligned substantially perpendicular to a longitudinal dimension of said ski boot supporting base, said balancing member extending to opposite sides of said base in a direction substantially perpendicular to said longitudinal dimension.

8. The device of claim 1 wherein said strengthening member extends away from a remainder of said base, and said base and said strengthening member are formed monolithically relative to each other.

9. A ski training aid system comprising:
    at least one training aid having a base, a strengthening member extending downwardly from said base and having a longitudinal dimension aligned with a substantially central longitudinal axis of said base, and a balancing member positionable underneath a ski boot to correspond with a center mark of said boot located on said boot to correspond with a notional sweet spot of a ski, said training aid allowing a user wearing said ski boot to pivot about said balancing member until a desired balancing position is reached whereby pressure is focused at said notional sweet spot, wherein said balancing member being removably attachable to said support;
    said strengthening member comprising a pair of angled end sections tapering toward a front end of said base and toward a rear end of said base, and a planar section between said angled end sections;
    said balancing member comprising a channel defined therein configured to receive said planar section of said strengthening member, said balancing member extending further away from said ski boot base than said strengthening member;
    instructions for at least one of attaching said training aid to said ski boot, removing said training aid from said ski boot, attaching said balancing member to said base of said training aid, removing said balancing member from said base, and training when wearing a pair of said ski boots with said training aid attached to each of said ski boots;
    a tool for at least one of attaching said training aid to said ski boot, removing said training aid from said ski boot, attaching said balancing member to said base of said training aid, removing said balancing member from said base; and
    a floor protector.

10. The system according to claim 9, wherein said balancing member is a plurality of balancing members, each of at least one of different sizes, shapes, and ground-contacting surface areas.

11. A method of training for skiing, said method comprising the steps of:
   a) providing a balancing member, and straps connected to a base; and a strengthening member extending from said base and longitudinally aligned with a substantially central longitudinal axis of said base;
   b) wearing at least one ski boot by a user;
   c) attaching said straps to said ski boot so that a sole of said ski boot is received on said base;
   d) attaching said balancing member to said strengthening member underneath a center mark of the boot and longitudinally relative to the base such that the center mark and the member are located at a same distance relative to an end of the base, the center mark located relative to said boot such that said balancing balancing member corresponds with a notional sweet spot of a ski; and
   e) said user wearing said ski boot and pivoting about said balancing member until a desired balancing position is reached whereby pressure is focused at said notional sweet spot;
   f) said strengthening member comprising a pair of angled end sections tapering toward a front end of said base and toward a rear end of said base, and a planar section between said angled end; and
   g) said balancing member comprising a channel defined therein configured to receive said planar section of said strengthening member, said balancing member extending further away from said ski boot base than said strengthening member.

12. The method according to claim 11, wherein said straps further comprise a pair of flexible sides connected to opposite sides of said base, and front and heel straps each having at least one end releasably secured to one of said flexible sides, said front and heel straps being configured to hold said base against said sole of said ski boot in a secure manner until said front and heels straps are released.

13. The method of claim 12 further comprising removing the balancing member and attaching a second balancing member at said predetermined balancing location to vary a difficulty of the user pivoting about said balancing pivotmember until the desired balancing position is reached.

14. A ski training device for training a user to focus pressure on a sweet spot of a ski, said training system comprising:
   a ski boot;
   a ski boot receiving member comprising straps connecting said boot to a top side of said receiving member;
   said ski boot receiving member comprising a strengthening member extending from a bottom side of said receiving member and having a longitudinal dimension extending longitudinally along a longitudinal dimension of said receiving member;
   a balancing member releaseably attached to said strengthening member and extending in a direction away from said ski boot;
   said balancing member positioned relative to said boot connected to said receiving member to be located longitudinally relative to said boot to correspond with a center mark located on a bottom of said boot such that said center mark and said member are located at a same longitudinal distance relative to an end of said boot, said center mark located to correspond with a notional sweet spot of a ski connectable to said boot, said balancing member allowing said user wearing said ski boot to pivot about said balancingmember until a desired balancing position is reached whereby pressure is focused at said notional sweet spot; and
   said balancing member comprising a channel defined therein configured to receive said strengthening member, said balancing member extending further away from said ski boot receiving member than said strengthening member;
   wherein said strengthening member comprises a pair of angled end sections tapering toward a front end of said receiving member and toward a rear end of said receiving member, and a planar section between said angled end sections.

* * * * *

UNITED STATES PATENT AND TRADEMARK OFFICE
CERTIFICATE OF CORRECTION

| | | |
|---|---|---|
| PATENT NO. | : 9,232,829 B2 | Page 1 of 1 |
| APPLICATION NO. | : 13/394584 | |
| DATED | : January 12, 2016 | |
| INVENTOR(S) | : Martin Breach | |

It is certified that error appears in the above-identified patent and that said Letters Patent is hereby corrected as shown below:

Claims

Column 28, Line 4: Claim 13, Delete "pivotmember" and insert --member--

Column 28, Line 29: Claim 14, Delete "balancingmember" and insert --balancing member--

Signed and Sealed this
Twelfth Day of April, 2016

Michelle K. Lee
*Director of the United States Patent and Trademark Office*